(12) United States Patent
Kipp et al.

(10) Patent No.: US 9,076,428 B2
(45) Date of Patent: *Jul. 7, 2015

(54) SOUND ATTENUATION BUILDING MATERIAL AND SYSTEM

(71) Applicant: Ashtech Industries, LLC, Provo, UT (US)

(72) Inventors: Michael D. Kipp, Provo, UT (US); Dilworth L. Pugh, Mapleton, UT (US); Michael D. Ridges, American Fork, UT (US); William T. McCarvill, Salt Lake City, UT (US)

(73) Assignee: Ashtech Industries, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,333

(22) Filed: May 20, 2013

(65) Prior Publication Data

US 2014/0151152 A1 Jun. 5, 2014

Related U.S. Application Data

(63) Continuation of application No. 12/238,399, filed on Sep. 25, 2008, now Pat. No. 8,445,101, which is a continuation-in-part of application No. 12/077,951, filed on Mar. 21, 2008, now abandoned.

(Continued)

(51) Int. Cl.
*B32B 9/04* (2006.01)
*B28B 5/00* (2006.01)
(Continued)

(52) U.S. Cl.
CPC .............. *G10K 11/165* (2013.01); *Y10T 428/25* (2015.01); *Y10T 428/24612* (2015.01);
(Continued)

(58) Field of Classification Search
CPC .. C04B 18/082; C04B 28/26; C04B 20/0032; C04B 2111/52; E04B 1/84; G10K 11/165
USPC ........... 52/144, 145, 167.8; 428/318.4, 304.4, 428/323, 340; 156/39; 181/290
See application file for complete search history.

(56) References Cited

U.S. PATENT DOCUMENTS 1,881,420 A 10/1932 Munroe
1,914,345 A 6/1933 Roos
(Continued)

FOREIGN PATENT DOCUMENTS

AU 2004201393 10/2005
EP 0475302 3/1992
(Continued)

OTHER PUBLICATIONS

Cenosphere; www.wikipedia.com; last modified Dec. 1, 2012; 2 pages.

(Continued)

*Primary Examiner* — Chi Q Nguyen
(74) *Attorney, Agent, or Firm* — Greenberg Traurig, LLP

(57) ABSTRACT

A building material configured to enhance sound attenuation and reduction in dB across a walled partition, the building material comprising a facing membrane, a core matrix disposed about the facing membrane, the core matrix comprising a plurality of microparticles and a binder solution configured to support the microparticles, the building material comprising at least a substantially exposed face, wherein a side of the core matrix is at least partially exposed to increase sound attenuation by reducing reflections from sound waves impinging on the building material as compared to a control building material lacking an exposed face. Two building materials may be used in conjunction with one another about a building structure, such as a stud wall, to create and define a sound trap that functions to reduce sound transmission across the partition formed by the stud wall and building materials.

17 Claims, 7 Drawing Sheets

Related U.S. Application Data

(60) Provisional application No. 60/919,509, filed on Mar. 21, 2007, provisional application No. 60/961,130, filed on Jul. 17, 2007, provisional application No. 61/002,367, filed on Nov. 8, 2007, provisional application No. 61/081,949, filed on Jul. 18, 2008, provisional application No. 61/081,953, filed on Jul. 18, 2008.

(51) Int. Cl.
| | |
|---|---|
| *G10K 11/165* | (2006.01) |
| *C04B 28/26* | (2006.01) |
| *E04B 1/86* | (2006.01) |
| *E04C 2/04* | (2006.01) |
| *E04C 2/16* | (2006.01) |
| *E04B 1/84* | (2006.01) |
| *C04B 18/08* | (2006.01) |
| *C04B 20/00* | (2006.01) |
| *C04B 111/52* | (2006.01) |

(52) U.S. Cl.
CPC ............ *Y10T 428/27* (2015.01); *E04B 1/84* (2013.01); *C04B 18/082* (2013.01); *C04B 20/0032* (2013.01); *C04B 28/26* (2013.01); *C04B 2111/52* (2013.01); *E04B 1/86* (2013.01); *E04B 2001/8419* (2013.01); *E04B 2001/8461* (2013.01); *E04B 2001/8476* (2013.01); *E04C 2/043* (2013.01); *E04C 2/16* (2013.01)

(56) References Cited

U.S. PATENT DOCUMENTS

| | | |
|---|---|---|
| 3,045,709 A | 7/1962 | Rapp |
| 3,501,419 A | 3/1970 | BridgeFord |
| 3,528,846 A | 9/1970 | Celmer et al. |
| 3,697,422 A | 10/1972 | Mackie |
| 3,703,394 A | 11/1972 | Hemming et al. |
| 3,769,770 A | 11/1973 | Deschamps et al. |
| 3,781,170 A | 12/1973 | Nakao et al. |
| 3,782,985 A | 1/1974 | Gebhardt |
| 3,933,513 A | 1/1976 | Mellows |
| 3,995,086 A | 11/1976 | Plunguian et al. |
| 4,025,686 A | 5/1977 | Zion |
| 4,074,482 A | 2/1978 | Klahr |
| 4,077,921 A | 3/1978 | Sharpe et al. |
| 4,079,162 A | 3/1978 | Metzger |
| 4,083,159 A | 4/1978 | Hatch et al. |
| 4,090,887 A | 5/1978 | Marquisee et al. |
| 4,292,348 A | 9/1981 | Dolan |
| 4,303,061 A | 12/1981 | Torobin |
| 4,303,431 A | 12/1981 | Torobin |
| 4,303,433 A | 12/1981 | Torobin |
| 4,303,603 A | 12/1981 | Torobin |
| 4,303,721 A | 12/1981 | Rodriguez |
| 4,303,729 A | 12/1981 | Torobin |
| 4,303,730 A | 12/1981 | Torobin |
| 4,303,732 A | 12/1981 | Torobin |
| 4,303,736 A | 12/1981 | Torobin |
| 4,332,618 A | 6/1982 | Ballard |
| 4,357,436 A | 11/1982 | Zucker et al. |
| 4,364,790 A | 12/1982 | Delcoigne et al. |
| 4,377,414 A | 3/1983 | Buschmann et al. |
| 4,415,512 A | 11/1983 | Torobin |
| 4,424,196 A | 1/1984 | Palmer et al. |
| 4,424,300 A | 1/1984 | Udvardy et al. |
| 4,425,440 A | 1/1984 | Bloembergen et al. |
| 4,438,028 A | 3/1984 | Schmittmann et al. |
| 4,441,944 A | 4/1984 | Massey |
| 4,446,177 A | 5/1984 | Munoz et al. |
| 4,476,258 A | 10/1984 | Hiles |
| 4,492,732 A | 1/1985 | Murphy et al. |
| 4,502,901 A | 3/1985 | Burkard |
| 4,504,320 A | 3/1985 | Rizer et al. |
| 4,522,878 A | 6/1985 | Martin et al. |
| 4,548,196 A | 10/1985 | Torobin |
| 4,568,389 A | 2/1986 | Torobin |
| 4,582,534 A | 4/1986 | Torobin |
| 4,594,279 A | 6/1986 | Yoneno et al. |
| 4,594,368 A | 6/1986 | Salyer et al. |
| 4,596,845 A | 6/1986 | Koyama et al. |
| 4,623,390 A | 11/1986 | Delmonico |
| 4,632,876 A | 12/1986 | Laird et al. |
| 4,644,014 A | 2/1987 | Thomson et al. |
| 4,659,385 A | 4/1987 | Costopoulos et al. |
| 4,661,301 A | 4/1987 | Okada et al. |
| 4,661,533 A | 4/1987 | Stobby |
| 4,666,960 A | 5/1987 | Spain |
| 4,671,994 A | 6/1987 | Cochran, Jr. |
| 4,673,697 A | 6/1987 | Rowley |
| 4,680,239 A | 7/1987 | Yano et al. |
| 4,681,788 A | 7/1987 | Barito et al. |
| 4,686,244 A | 8/1987 | Dietlein et al. |
| 4,686,252 A | 8/1987 | Burge et al. |
| 4,687,752 A | 8/1987 | Peters |
| 4,721,160 A | 1/1988 | Parcevaux et al. |
| 4,731,389 A | 3/1988 | Christopher et al. |
| 4,741,782 A | 5/1988 | Styron |
| 4,744,842 A | 5/1988 | Webster et al. |
| 4,760,296 A | 7/1988 | Johnston et al. |
| 4,770,708 A | 9/1988 | Atkins et al. |
| 4,780,484 A | 10/1988 | Schubert et al. |
| 4,798,753 A | 1/1989 | Abuaf et al. |
| 4,798,762 A | 1/1989 | Okada et al. |
| 4,839,394 A | 6/1989 | Champion |
| 4,861,097 A | 8/1989 | Wycech |
| 4,885,203 A | 12/1989 | Wakat |
| 4,901,500 A | 2/1990 | Wycech |
| 4,904,709 A | 2/1990 | Hermele |
| 4,933,031 A | 6/1990 | Blomberg et al. |
| 4,940,676 A | 7/1990 | Evans |
| 4,950,627 A | 8/1990 | Tokarz et al. |
| 4,960,184 A | 10/1990 | Woodward et al. |
| 4,963,420 A | 10/1990 | Jarrin et al. |
| 4,988,478 A | 1/1991 | Held |
| 5,064,266 A | 11/1991 | Sun et al. |
| 5,079,329 A | 1/1992 | Muhlfeld et al. |
| 5,091,256 A | 2/1992 | Bopp et al. |
| 5,094,111 A | 3/1992 | Collins et al. |
| 5,098,577 A | 3/1992 | McLaughlin et al. |
| 5,125,812 A | 6/1992 | Held |
| 5,126,192 A | 6/1992 | Chellis et al. |
| 5,134,179 A | 7/1992 | Felegi, Jr. et al. |
| 5,140,089 A | 8/1992 | Muhlfeld et al. |
| 5,141,972 A | 8/1992 | Sato |
| 5,147,722 A | 9/1992 | Koslow |
| 5,162,397 A | 11/1992 | Descamps et al. |
| 5,211,238 A | 5/1993 | Carpenter |
| 5,217,552 A | 6/1993 | Miyajima et al. |
| 5,218,016 A | 6/1993 | Jarrin et al. |
| 5,225,124 A | 7/1993 | Sorathia et al. |
| 5,228,494 A | 7/1993 | Rohatgi |
| 5,256,222 A | 10/1993 | Shepherd et al. |
| 5,302,634 A | 4/1994 | Mushovic |
| 5,342,566 A | 8/1994 | Schafer et al. |
| 5,359,735 A | 11/1994 | Stockwell |
| 5,369,147 A | 11/1994 | Mushovic |
| 5,393,794 A | 2/1995 | Sperber |
| 5,424,099 A | 6/1995 | Stewart et al. |
| 5,472,760 A | 12/1995 | Norvell |
| 5,476,343 A | 12/1995 | Sumner |
| 5,492,696 A | 2/1996 | Price et al. |
| 5,492,870 A | 2/1996 | Wilcox et al. |
| 5,506,046 A | 4/1996 | Andersen et al. |
| 5,508,072 A | 4/1996 | Andersen et al. |
| 5,512,324 A | 4/1996 | Paulus et al. |
| 5,534,058 A | 7/1996 | Strabala |
| 5,540,793 A | 7/1996 | Bals et al. |
| 5,543,186 A | 8/1996 | Andersen et al. |
| 5,549,859 A | 8/1996 | Andersen et al. |
| 5,571,592 A | 11/1996 | McGregor et al. |
| 5,574,561 A | 11/1996 | Boudreau et al. |

(56) References Cited

U.S. PATENT DOCUMENTS

| | | |
|---|---|---|
| 5,580,378 A | 12/1996 | Shulman |
| 5,582,670 A | 12/1996 | Andersen et al. |
| 5,600,930 A | 2/1997 | Drucker |
| 5,601,643 A | 2/1997 | Silverstrim et al. |
| 5,604,266 A | 2/1997 | Mushovic |
| 5,614,307 A | 3/1997 | Andersen et al. |
| 5,622,556 A | 4/1997 | Shulman |
| 5,624,737 A | 4/1997 | Fairbanks et al. |
| 5,626,954 A | 5/1997 | Andersen et al. |
| 5,631,097 A | 5/1997 | Andersen et al. |
| 5,679,145 A | 10/1997 | Andersen et al. |
| 5,683,772 A | 11/1997 | Andersen et al. |
| 5,711,362 A | 1/1998 | Rohatgi |
| 5,713,974 A | 2/1998 | Martin et al. |
| 5,725,652 A | 3/1998 | Shulman |
| 5,746,932 A | 5/1998 | Rendall et al. |
| 5,754,491 A | 5/1998 | Cushman |
| 5,766,686 A | 6/1998 | Perich et al. |
| 5,770,267 A | 6/1998 | Bullock, Jr. |
| 5,786,095 A | 7/1998 | Batdorf |
| 5,788,184 A | 8/1998 | Eddy |
| 5,795,102 A | 8/1998 | Corbishley |
| 5,798,151 A | 8/1998 | Andersen et al. |
| 5,810,961 A | 9/1998 | Andersen et al. |
| 5,814,250 A | 9/1998 | Dudt et al. |
| 5,817,230 A | 10/1998 | Groppo, Jr. et al. |
| 5,830,548 A | 11/1998 | Andersen et al. |
| 5,840,179 A | 11/1998 | Minkara et al. |
| 5,849,650 A | 12/1998 | Rorabaugh et al. |
| 5,862,772 A | 1/1999 | Yancey et al. |
| 5,866,641 A | 2/1999 | Ronden et al. |
| 5,884,960 A | 3/1999 | Wycech |
| 5,897,943 A | 4/1999 | Rohatgi |
| 5,899,256 A | 5/1999 | Rohatgi |
| 5,910,082 A | 6/1999 | Bender et al. |
| 5,913,002 A | 6/1999 | Jiang |
| 5,944,888 A | 8/1999 | Perich et al. |
| 5,948,323 A | 9/1999 | McLaughlin et al. |
| 5,965,257 A | 10/1999 | Ahluwalia |
| 5,971,631 A | 10/1999 | Poole et al. |
| 5,980,980 A | 11/1999 | DiChiara, Jr. et al. |
| 5,981,631 A | 11/1999 | Ronden |
| 5,983,984 A | 11/1999 | Auderheide et al. |
| 5,988,396 A | 11/1999 | Minkara et al. |
| 6,020,062 A | 2/2000 | Questel et al. |
| 6,022,912 A | 2/2000 | Spitler et al. |
| 6,058,979 A | 5/2000 | Watkins |
| 6,060,535 A | 5/2000 | Villar et al. |
| 6,074,727 A | 6/2000 | Miller et al. |
| 6,085,865 A | 7/2000 | Delverdier et al. |
| 6,096,812 A | 8/2000 | Hanafin et al. |
| 6,103,360 A | 8/2000 | Caldwell et al. |
| 6,155,305 A | 12/2000 | Sumner |
| 6,165,308 A | 12/2000 | Chen et al. |
| 6,166,109 A | 12/2000 | Spitler et al. |
| 6,183,852 B1 | 2/2001 | Rorabaugh et al. |
| 6,187,697 B1 | 2/2001 | Jaffee et al. |
| 6,194,051 B1 | 2/2001 | Gagas et al. |
| 6,207,738 B1 | 3/2001 | Zuckerman et al. |
| 6,231,970 B1 | 5/2001 | Andersen et al. |
| 6,245,842 B1 | 6/2001 | Buxton et al. |
| 6,251,979 B1 | 6/2001 | Luongo |
| 6,265,040 B1 | 7/2001 | Neale et al. |
| 6,277,454 B1 | 8/2001 | Neale et al. |
| 6,280,759 B1 | 8/2001 | Price et al. |
| 6,309,492 B1 | 10/2001 | Seidner |
| 6,319,968 B1 | 11/2001 | Bildner et al. |
| 6,362,252 B1 | 3/2002 | Prutkin |
| 6,368,527 B1 | 4/2002 | Gontmakher et al. |
| 6,376,022 B1 | 4/2002 | Mallow et al. |
| 6,379,497 B1 | 4/2002 | Sandstrom et al. |
| 6,380,114 B1 | 4/2002 | Brandy |
| 6,387,447 B1 | 5/2002 | Grimm et al. |
| 6,391,958 B1 | 5/2002 | Luongo |
| 6,397,549 B1 | 6/2002 | Baldwin |
| 6,399,155 B2 | 6/2002 | Child et al. |
| 6,413,458 B1 | 7/2002 | Pearce |
| 6,417,125 B1 | 7/2002 | Rorabaugh et al. |
| 6,420,034 B1 | 7/2002 | Takahashi et al. |
| 6,432,482 B1 | 8/2002 | Jaffee et al. |
| 6,444,162 B1 | 9/2002 | Anshits et al. |
| 6,444,594 B1 | 9/2002 | Child et al. |
| 6,458,412 B2 | 10/2002 | Child et al. |
| 6,472,579 B1 | 10/2002 | Anshits et al. |
| 6,491,984 B2 | 12/2002 | Rigosi et al. |
| 6,503,976 B2 | 1/2003 | Zuckerman et al. |
| 6,514,362 B1 | 2/2003 | Zuckerman et al. |
| 6,531,222 B1 | 3/2003 | Tanaka et al. |
| 6,534,176 B2 | 3/2003 | Terase et al. |
| 6,545,066 B1 | 4/2003 | Immordino, Jr. et al. |
| 6,551,701 B1 | 4/2003 | Nohr et al. |
| 6,559,082 B1 | 5/2003 | Desvignes et al. |
| 6,569,923 B1 | 5/2003 | Slagter |
| 6,572,697 B2 | 6/2003 | Gleeson et al. |
| 6,572,736 B2 | 6/2003 | Bush et al. |
| 6,576,574 B2 | 6/2003 | Child et al. |
| 6,582,819 B2 | 6/2003 | McDaniel et al. |
| 6,584,742 B1 | 7/2003 | Kligler et al. |
| 6,586,353 B1 | 7/2003 | Kiik et al. |
| 6,601,647 B2 | 8/2003 | Brothers et al. |
| 6,620,487 B1 | 9/2003 | Tonyan et al. |
| 6,630,221 B1 | 10/2003 | Wong |
| 6,631,603 B2 | 10/2003 | Zornes |
| 6,631,766 B2 | 10/2003 | Brothers et al. |
| 6,632,527 B1 | 10/2003 | McDaniel et al. |
| 6,644,405 B2 | 11/2003 | Vijn et al. |
| 6,648,961 B2 | 11/2003 | Brothers et al. |
| 6,659,362 B1 | 12/2003 | Hallissy et al. |
| 6,660,078 B2 | 12/2003 | Brothers et al. |
| 6,660,667 B2 | 12/2003 | Zuckerman et al. |
| 6,667,261 B1 | 12/2003 | Anshits et al. |
| 6,673,144 B2 | 1/2004 | Immordino, Jr. et al. |
| 6,673,432 B2 | 1/2004 | Kiik et al. |
| 6,692,678 B2 | 2/2004 | Krowl et al. |
| 6,699,522 B2 | 3/2004 | Sakakibara |
| 6,699,559 B1 | 3/2004 | Milburn |
| 6,708,456 B2 | 3/2004 | Kiik et al. |
| 6,713,008 B1 | 3/2004 | Teeter |
| 6,716,293 B2 | 4/2004 | Taymourian et al. |
| 6,739,806 B1 | 5/2004 | Szymanski et al. |
| 6,740,373 B1 | 5/2004 | Swoboda et al. |
| 6,743,830 B2 | 6/2004 | Soane et al. |
| 6,749,897 B2 | 6/2004 | Naji et al. |
| 6,758,305 B2 | 7/2004 | Gelin et al. |
| 6,802,938 B2 | 10/2004 | Mohan et al. |
| 6,811,603 B2 | 11/2004 | Brothers et al. |
| 6,814,798 B2 | 11/2004 | Vijn et al. |
| 6,831,876 B1 | 12/2004 | Cartwright |
| 6,833,203 B2 | 12/2004 | Bose et al. |
| 6,840,994 B2 | 1/2005 | Krowl et al. |
| 6,846,529 B2 | 1/2005 | Mohan et al. |
| 6,852,765 B2 | 2/2005 | Decker et al. |
| 6,858,280 B2 | 2/2005 | Allen et al. |
| 6,865,811 B2 | 3/2005 | Wycech |
| 6,872,440 B1 | 3/2005 | Kiik et al. |
| 6,893,751 B2 | 5/2005 | Naji et al. |
| 6,901,713 B2 | 6/2005 | Axsom |
| 6,902,614 B2 | 6/2005 | Ratomski et al. |
| 6,910,507 B2 | 6/2005 | Simon et al. |
| 6,916,863 B2 | 7/2005 | Hemmings et al. |
| 6,919,111 B2 | 7/2005 | Swoboda et al. |
| 6,939,610 B1 | 9/2005 | Kaul |
| 6,953,129 B2 | 10/2005 | DeLay |
| 6,955,778 B2 | 10/2005 | Huntemann |
| 6,960,388 B2 | 11/2005 | Hallissy et al. |
| 6,974,494 B1 | 12/2005 | Zahedi |
| 6,988,343 B2 | 1/2006 | Gleeson et al. |
| 6,995,098 B2 | 2/2006 | McGrady et al. |
| 7,021,018 B2 | 4/2006 | Peng |
| 7,037,572 B2 | 5/2006 | Gleeson |
| 7,037,865 B1 | 5/2006 | Kimberly |
| 7,041,167 B2 | 5/2006 | Jiang |
| 7,060,213 B2 | 6/2006 | Pearce |
| 7,073,585 B2 | 7/2006 | Morgan et al. |

(56) References Cited

U.S. PATENT DOCUMENTS

| | | |
|---|---|---|
| 7,074,499 B2 | 7/2006 | Schnurer et al. |
| 7,076,822 B2 | 7/2006 | Pearce |
| 7,083,758 B2 | 8/2006 | Tremblay |
| 7,090,918 B2 | 8/2006 | Leroux et al. |
| 7,091,277 B2 | 8/2006 | Rydin et al. |
| 7,101,607 B2 | 9/2006 | Mollendorf et al. |
| 7,115,542 B2 | 10/2006 | Tranter et al. |
| 7,155,868 B2 | 1/2007 | Cole et al. |
| 7,156,174 B2 | 1/2007 | Roddy et al. |
| 7,156,914 B2 | 1/2007 | Shimanovich |
| 7,159,368 B2 | 1/2007 | Peng |
| 7,166,355 B2 | 1/2007 | Jahns et al. |
| 7,174,962 B1 | 2/2007 | Roddy et al. |
| 7,204,065 B2 | 4/2007 | Naji |
| 7,217,458 B2 | 5/2007 | Liu et al. |
| 7,291,234 B2 | 11/2007 | Glorioso |
| 7,318,288 B2 | 1/2008 | Zahedi et al. |
| 7,845,130 B2 | 12/2010 | Tonyan et al. |
| 8,349,444 B2 | 1/2013 | Kipp et al. |
| 8,440,296 B2 | 5/2013 | Kipp et al. |
| 8,445,101 B2 | 5/2013 | Kipp et al. |
| 2001/0006704 A1 | 7/2001 | Chen et al. |
| 2001/0026802 A1 | 10/2001 | Price et al. |
| 2001/0043996 A1 | 11/2001 | Yamada et al. |
| 2001/0051249 A1 | 12/2001 | Gagas et al. |
| 2002/0017224 A1 | 2/2002 | Horton |
| 2002/0054957 A1 | 5/2002 | Johnsen et al. |
| 2002/0069603 A1 | 6/2002 | Zornes |
| 2002/0103091 A1 | 8/2002 | Kodali |
| 2002/0112648 A1 | 8/2002 | Krowl et al. |
| 2002/0128142 A1 | 9/2002 | Godeke et al. |
| 2002/0142022 A1 | 10/2002 | Price et al. |
| 2002/0157573 A1 | 10/2002 | Pellett |
| 2002/0170467 A1 | 11/2002 | Naji et al. |
| 2002/0175126 A1 | 11/2002 | Naji et al. |
| 2002/0178672 A1 | 12/2002 | Robinson et al. |
| 2002/0179219 A1 | 12/2002 | Naji et al. |
| 2002/0189499 A1 | 12/2002 | Naji et al. |
| 2003/0000424 A1 | 1/2003 | Naji et al. |
| 2003/0029360 A1 | 2/2003 | Krowl et al. |
| 2003/0054157 A1 | 3/2003 | Taymourian et al. |
| 2003/0056696 A1 | 3/2003 | Fenske et al. |
| 2003/0057594 A1 | 3/2003 | Anderson et al. |
| 2003/0087029 A1 | 5/2003 | Decker et al. |
| 2003/0096899 A1 | 5/2003 | Pearce |
| 2003/0126817 A1 | 7/2003 | Gleeson et al. |
| 2003/0126822 A1 | 7/2003 | Gleeson |
| 2003/0129348 A1 | 7/2003 | Peng |
| 2003/0131550 A1 | 7/2003 | Cole et al. |
| 2003/0134920 A1 | 7/2003 | Poisl et al. |
| 2003/0136072 A1 | 7/2003 | Peng |
| 2003/0153635 A1 | 8/2003 | Spitler et al. |
| 2003/0175497 A1 | 9/2003 | Kobe et al. |
| 2003/0205172 A1 | 11/2003 | Gleeson et al. |
| 2004/0003570 A1 | 1/2004 | Phillips et al. |
| 2004/0003759 A1 | 1/2004 | Brothers et al. |
| 2004/0022941 A1 | 2/2004 | Glorioso |
| 2004/0054035 A1 | 3/2004 | Hallissy et al. |
| 2004/0067352 A1 | 4/2004 | Hagerman et al. |
| 2004/0074184 A1 | 4/2004 | Naji |
| 2004/0081827 A1 | 4/2004 | Datta et al. |
| 2004/0102534 A1 | 5/2004 | Orpin |
| 2004/0123555 A1 | 7/2004 | Cole |
| 2004/0157961 A1 | 8/2004 | Tullos et al. |
| 2004/0170873 A1 | 9/2004 | Smith |
| 2004/0171499 A1 | 9/2004 | Ravi et al. |
| 2004/0176486 A1 | 9/2004 | Glorioso et al. |
| 2004/0192148 A1 | 9/2004 | Kajander |
| 2004/0194421 A1 | 10/2004 | Canti |
| 2004/0194657 A1 | 10/2004 | Lally |
| 2004/0202810 A1 | 10/2004 | Peng |
| 2004/0211139 A1 | 10/2004 | Peng |
| 2004/0221529 A1 | 11/2004 | Zornes |
| 2004/0226098 A1 | 11/2004 | Pearce |
| 2004/0226099 A1 | 11/2004 | Pearce |
| 2004/0229986 A1 | 11/2004 | Pearce |
| 2004/0234595 A1 | 11/2004 | Mohammad |
| 2004/0235379 A1 | 11/2004 | Ahluwalia et al. |
| 2004/0244654 A1 | 12/2004 | Allouche et al. |
| 2004/0249005 A1 | 12/2004 | Kron et al. |
| 2005/0011412 A1 | 1/2005 | Vijn et al. |
| 2005/0017396 A1 | 1/2005 | Pearce et al. |
| 2005/0019548 A1 | 1/2005 | Liu et al. |
| 2005/0019552 A1 | 1/2005 | Wiersma et al. |
| 2005/0025952 A1 | 2/2005 | Field et al. |
| 2005/0072087 A1 | 4/2005 | Fanucci et al. |
| 2005/0079352 A1 | 4/2005 | Glorioso et al. |
| 2005/0090615 A1 | 4/2005 | Fisher |
| 2005/0126441 A1 | 6/2005 | Skelhorn |
| 2005/0133183 A1 | 6/2005 | Mohan et al. |
| 2005/0137279 A1 | 6/2005 | Decker et al. |
| 2005/0153070 A1 | 7/2005 | Decker et al. |
| 2005/0176833 A1 | 8/2005 | Tay |
| 2005/0181693 A1 | 8/2005 | Kajander |
| 2005/0197444 A1 | 9/2005 | Kyte et al. |
| 2005/0202258 A1 | 9/2005 | Swales et al. |
| 2005/0252420 A1 | 11/2005 | Timmons |
| 2005/0255318 A1 | 11/2005 | Czerny |
| 2005/0256228 A1 | 11/2005 | Ariel |
| 2005/0281997 A1 | 12/2005 | Grah |
| 2005/0287293 A1 | 12/2005 | Rothman |
| 2005/0288394 A1 | 12/2005 | Rothman et al. |
| 2006/0000155 A1 | 1/2006 | Wagner |
| 2006/0016617 A1 | 1/2006 | Corbishley |
| 2006/0037815 A1 | 2/2006 | Schabel, Jr. |
| 2006/0040096 A1 | 2/2006 | Eadara et al. |
| 2006/0051595 A1 | 3/2006 | Gaudeus et al. |
| 2006/0054059 A1 | 3/2006 | Dubey et al. |
| 2006/0054061 A1 | 3/2006 | Ruddick |
| 2006/0059825 A1 | 3/2006 | Wiercinski et al. |
| 2006/0084743 A1 | 4/2006 | Chen |
| 2006/0096074 A1 | 5/2006 | Foster et al. |
| 2006/0099405 A1 | 5/2006 | Guiselin et al. |
| 2006/0101785 A1 | 5/2006 | Wiercinski et al. |
| 2006/0144005 A1 | 7/2006 | Tonyan et al. |
| 2006/0147681 A1 | 7/2006 | Dubey |
| 2006/0160914 A1 | 7/2006 | Orpin |
| 2006/0165885 A1 | 7/2006 | Fay |
| 2006/0168906 A1 | 8/2006 | Tonyan et al. |
| 2006/0174572 A1 | 8/2006 | Tonyan et al. |
| 2006/0177661 A1 | 8/2006 | Smith et al. |
| 2006/0178453 A1 | 8/2006 | Bohler |
| 2006/0178461 A1 | 8/2006 | Bohler et al. |
| 2006/0185267 A1 | 8/2006 | Tonyan et al. |
| 2006/0188674 A1 | 8/2006 | Fernette et al. |
| 2006/0216471 A1 | 9/2006 | Grah et al. |
| 2006/0253988 A1 | 11/2006 | Pearce |
| 2006/0260811 A1 | 11/2006 | Nguyen et al. |
| 2006/0269738 A1 | 11/2006 | Kimberly |
| 2006/0280970 A1 | 12/2006 | Lettkeman et al. |
| 2007/0020475 A1 | 1/2007 | Prince et al. |
| 2007/0027227 A1 | 2/2007 | Shutov |
| 2007/0027234 A1 | 2/2007 | Sigworth et al. |
| 2007/0044397 A1 | 3/2007 | Wiercinski et al. |
| 2007/0048445 A1 | 3/2007 | DiMario |
| 2007/0048504 A1 | 3/2007 | DiMario |
| 2007/0054797 A1 | 3/2007 | Thomas |
| 2007/0056476 A1 | 3/2007 | Roddy et al. |
| 2007/0062143 A1 | 3/2007 | Noushad |
| 2007/0077436 A1 | 4/2007 | Naji et al. |
| 2007/0093392 A1 | 4/2007 | Vavra et al. |
| 2007/0094992 A1 | 5/2007 | Antonic |
| 2007/0130864 A1 | 6/2007 | Semmens et al. |
| 2007/0141316 A1 | 6/2007 | McGrath et al. |
| 2007/0148429 A1 | 6/2007 | McGrath et al. |
| 2007/0155859 A1 | 7/2007 | Song et al. |
| 2007/0175126 A1 | 8/2007 | Tonyan et al. |
| 2007/0193143 A1 | 8/2007 | Antonic |
| 2007/0214676 A1 | 9/2007 | Zahedi et al. |
| 2007/0237829 A1 | 10/2007 | Dadachova et al. |
| 2007/0261224 A1 | 11/2007 | McLeod |
| 2007/0294974 A1 | 12/2007 | Tonyan et al. |
| 2008/0098935 A1 | 5/2008 | Roth et al. |
| 2008/0099133 A1 | 5/2008 | Stivender |

(56) References Cited

U.S. PATENT DOCUMENTS

| | | | |
|---|---|---|---|
| 2008/0099171 A1 | 5/2008 | Frank et al. |
| 2008/0101150 A1 | 5/2008 | George et al. |
| 2008/0101151 A1 | 5/2008 | Frank et al. |
| 2008/0110276 A1 | 5/2008 | Frank et al. |
| 2009/0004459 A1 | 1/2009 | Kipp et al. |
| 2009/0107059 A1 | 4/2009 | Kipp et al. |
| 2009/0239429 A1 | 9/2009 | Kipp et al. |
| 2010/0016459 A1 | 1/2010 | Cernohous |
| 2010/0116405 A1 | 5/2010 | Kipp et al. |

FOREIGN PATENT DOCUMENTS

| | | |
|---|---|---|
| EP | 1 016 757 | 7/2000 |
| EP | 1 038 898 | 9/2000 |
| EP | 1 272 340 | 4/2005 |
| EP | 1568489 | 8/2005 |
| GB | 1514239 | 6/1978 |
| GB | 2041384 | 9/1980 |
| GB | 2357111 | 6/2001 |
| JP | 5-269722 | 10/1993 |
| JP | 8-1854 | 1/1996 |
| JP | 09-156010 | 6/1997 |
| JP | 11-322880 | 11/1999 |
| JP | 11-351610 | 12/1999 |
| JP | 2002-144468 | 5/2002 |
| JP | 2006-083048 | 3/2006 |
| KR | 10-1996-7958 | 3/1996 |
| WO | WO 93/10972 | 6/1993 |
| WO | WO 9316245 | 8/1993 |
| WO | WO 97/17508 | 5/1997 |
| WO | WO 99/44087 | 9/1999 |
| WO | WO 00/24577 | 5/2000 |
| WO | WO 00/27635 | 5/2000 |
| WO | WO 00/35847 | 6/2000 |
| WO | WO 00/36236 | 6/2000 |
| WO | WO 01/59381 | 8/2001 |
| WO | WO 01/66669 | 9/2001 |
| WO | WO 02/42064 | 5/2002 |
| WO | WO 02/060839 | 8/2002 |
| WO | WO 02/092927 | 11/2002 |
| WO | WO 02/092928 | 11/2002 |
| WO | WO 02/100957 | 12/2002 |
| WO | WO 03/045687 | 6/2003 |
| WO | WO 03/045688 | 6/2003 |
| WO | WO 03/046100 | 6/2003 |
| WO | WO 03/078735 | 9/2003 |
| WO | WO 2004/005640 | 1/2004 |
| WO | WO 2004/101903 | 11/2004 |
| WO | WO 2005/003056 | 1/2005 |
| WO | WO 2005/016608 | 2/2005 |
| WO | WO 2006/000035 | 1/2006 |
| WO | WO 2006/007413 | 1/2006 |
| WO | WO 2006-018904 | 2/2006 |
| WO | WO 2006/034146 | 3/2006 |
| WO | WO 2006/065259 | 6/2006 |
| WO | WO 2006/071519 | 7/2006 |
| WO | WO 2006/071920 | 7/2006 |
| WO | WO 2006/073540 | 7/2006 |
| WO | WO 2006/073723 | 7/2006 |
| WO | WO 2006/081066 | 8/2006 |
| WO | WO 2006/081080 | 8/2006 |
| WO | WO 2006/081155 | 8/2006 |
| WO | WO 2006/081156 | 8/2006 |
| WO | WO 2006/113379 | 10/2006 |
| WO | WO 2007/020657 | 2/2007 |
| WO | WO 2007/021653 | 2/2007 |
| WO | WO 2007/041272 | 4/2007 |
| WO | WO 2007/047318 | 4/2007 |
| WO | WO 2007/056629 | 5/2007 |
| WO | WO 2007/075693 | 7/2007 |
| WO | WO 2007/079104 | 7/2007 |
| WO | WO 2007/081645 | 7/2007 |
| WO | WO 2007/097988 | 8/2007 |
| WO | WO 2008/002511 | 1/2008 |
| WO | WO 2008/003147 | 1/2008 |
| WO | WO 2008/020768 | 2/2008 |
| WO | WO 2008/037001 | 4/2008 |
| WO | WO 2008/057273 | 5/2008 |
| WO | WO 2008/057275 | 5/2008 |
| WO | WO 2008/057390 | 5/2008 |
| WO | WO 2008057274 | 5/2008 |
| WO | WO 2008/076376 | 6/2008 |

OTHER PUBLICATIONS

The 3M Ceramic Microspheres brochure; 2010; 2 pages.
U.S. Appl. No. 12/612,675, filed Nov. 4, 2009; Michael D. Kipp; office action dated Jul. 5, 2013.

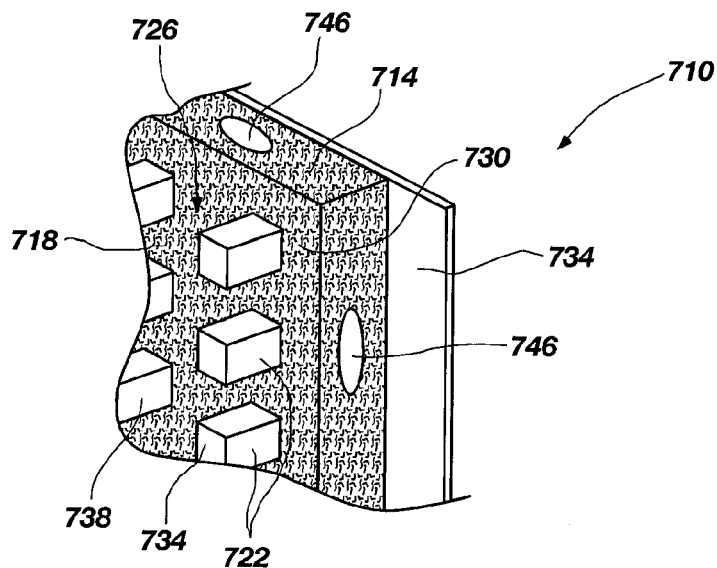
FIG. 6
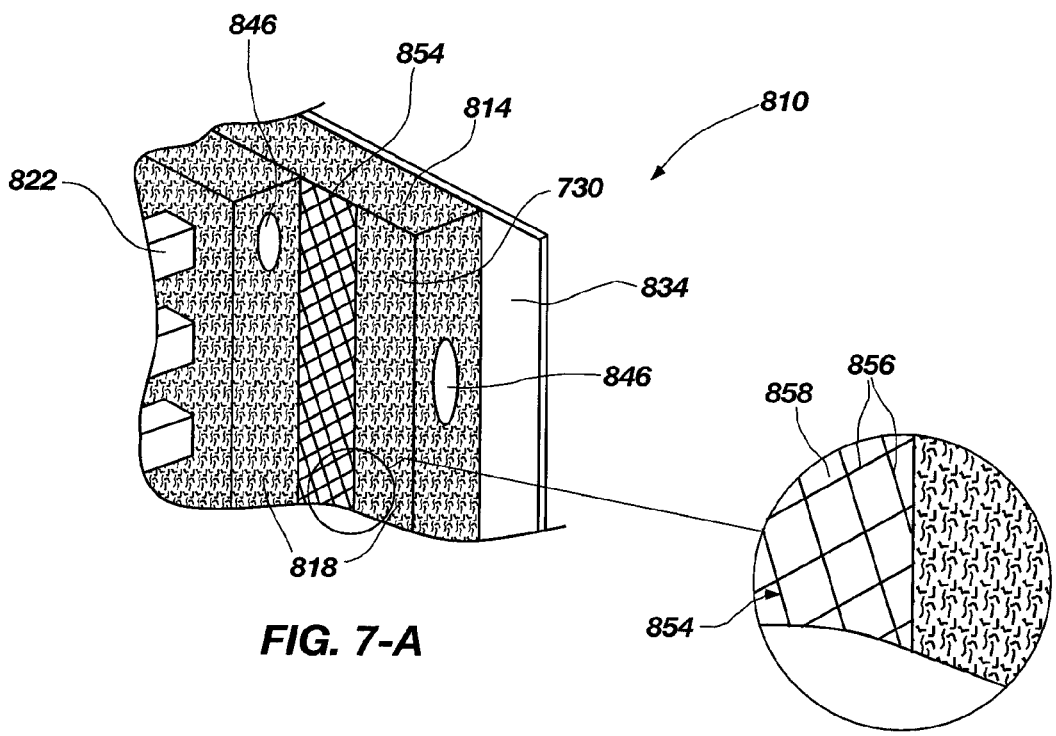
FIG. 7-A
FIG. 7-B

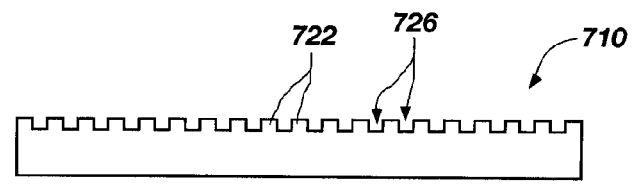
FIG. 11
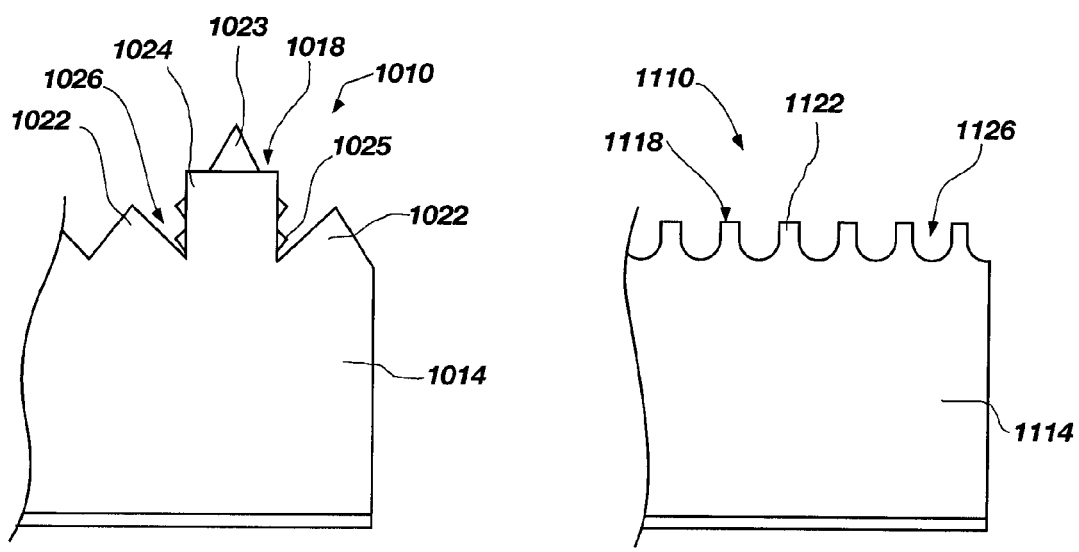
FIG. 12  FIG. 13
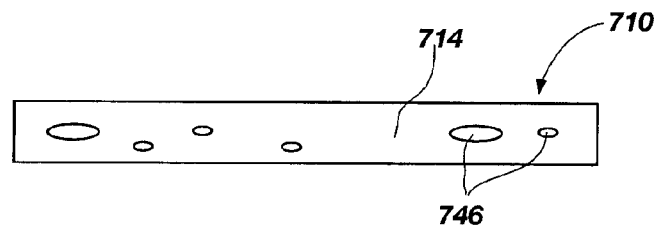
FIG. 14

SOUND ATTENUATION BUILDING MATERIAL AND SYSTEM

RELATED APPLICATIONS

This application is a continuation of U.S. patent application Ser. No. 12/238,399, filed on Sep. 25, 2008, now U.S. Pat. No. 8,445,101, issued on May 21, 2013, which is a continuation-in-part of U.S. patent application Ser. No. 12/077,951, filed on Mar. 21, 2008, which claims the benefit of U.S. Provisional Patent Application No. 60/919,509, filed on Mar. 21, 2007, and of U.S. Provisional Patent Application No. 60/961,130, filed on Jul. 17, 2007, and of U.S. Provisional Patent Application No. 61/002,367, filed on Nov. 7, 2007; this application claims the benefit of U.S. Provisional Patent Application No. 61/081,949, filed Jul. 18, 2008; this application claims the benefit of U.S. Provisional Patent Application No. 61/081,953, filed Jul. 18, 2008, which are each incorporated by reference herein in their entireties.

FIELD OF THE INVENTION

The present invention relates to building materials, and more particularly to wallboard and other building materials comprising sound attenuation properties.

BACKGROUND OF THE INVENTION AND RELATED ART

Several building materials are designed with sound attenuation or absorption properties in mind as it is often desirable to minimize, or at least reduce, the amount of sound that can be heard across a partition. With respect to building structures, building materials such as wallboard, insulation, and often paint, are considered materials that can contribute to a reduction in sound.

Wallboard is a common utility or building material, which comes in many different types, designs, and sizes. Wallboard can be configured to exhibit many different properties or characteristics, such as different sound absorption, heat transfer and/or fire resistance properties. By far, the most common type of wallboard is drywall or gypsum board. Drywall comprises an inner core of gypsum, the semi-hydrous form of calcium sulphate ($CaSO_4 \cdot \frac{1}{2} H_2O$), disposed between two facing membranes, typically paper or fiberglass mats. Drywall may comprise various additives and fillers to vary its properties.

The most commonly used drywall is one-half-inch thick but can range from one quarter (6.35 mm) to one inch (25 mm) in thickness. For soundproofing or fire resistance, two layers of drywall are sometimes laid at right angles to one another. Drywall provides a thermal resistance, or R value, of 0.32 for three-eighths-inch board, 0.45 for half inch, 0.56 for five-eighths inch and 0.83 for one-inch board. In addition to increased R-value, thicker drywall has a slightly higher Sound Transmission Class (STC) rating.

STC, part of ASTM International Classification E413 and E90, is a widely used standard for rating how well a building material attenuates airborne sound. The STC number is derived from sound attenuation values tested at sixteen standard frequencies from 125 Hz to 4000 Hz. These transmission-loss values are then plotted on a sound pressure level graph and the resulting curve is compared to a standard reference contour. Acoustical engineers fit these values to the appropriate TL Curve (or Transmission Loss) to determine an STC rating. STC can be thought of as the decibel reduction in noise that a wall or other partition can provide. The dB scale is logarithmic, with the human ear perceiving a 10 dB reduction in sound as roughly halving the volume. Therefore, any reduction in dB is significant. The reduction in dB for the same material depends upon the frequency of the sound transmission. The higher the STC rating, the more effective the barrier is at reducing the transmission of most common sound frequencies.

Conventional interior walls in homes or buildings have opposing sheets of drywall mounted on a stud frame or stud wall. In this arrangement, with the drywall panels having a ½ inch thickness, the interior wall measures an STC of about 33. Adding fiberglass insulation helps, but only increases the STC to 36-39, depending upon the type and quality of insulation, as well as stud and screw spacing. As wallboard is typically comprised of several sheets or panels, the small cracks or gaps between panels, or any other cracks or gaps in the wall structure are referred to as "flanking paths," and will allow sound to transmit more freely, thus resulting in a lower overall STC rating. For this reason it is critical that all potential flanking paths be eliminated or reduced as much as possible.

Similarly, the Outdoor-Indoor Transmission Class (OITC) is the widely used standard for indicating the rate of transmission of sound between outdoor and indoor spaces. OITC testing typically considers frequencies down to 80 Hz and is weighted more to lower frequencies.

SUMMARY OF THE INVENTION

Accordingly, the present invention provides sound attenuating building materials, systems, and methods for attenuating sound. In one aspect, for example, a sound attenuating building material is provided. Such a building material can include a core matrix disposed on a facing material, where the core matrix includes a plurality of microparticles, and a binder configured to support the microparticles, and wherein a side of the core matrix is exposed to create an at least substantially exposed face of the building material to increase sound attenuation by reducing reflections from sound waves impinging on the building material as compared to a control building material lacking an exposed face. The building material can further include an acoustically transparent material disposed on the exposed face of the building material. Such an acoustically transparent material can include a screen or mesh material. Additionally, in some aspects the building material can further include a rigid material associated with the core matrix. In one specific aspect, the rigid material is disposed within the core matrix.

A variety of microparticles are contemplated for inclusion in the core matrixes of the present invention. In one aspect, the microspheres are hollow. In another aspect, the microspheres are filled with an inert gas. In yet another aspect, the microspheres are made from fly ash.

The exposed face of the building material can include a variety of configurations, from relatively planar to substantially non-planar. For example, in one aspect the substantially exposed face has a plurality of protrusions extending from the core matrix. Such protrusions can vary depending on the intended properties of the building material, however in one aspect the protrusions are spaced in a predetermined pattern.

The present invention additionally provides a system for attenuating sound using a building material. Such a system can include a first building material, a second building material disposed in a substantially parallel orientation to the first building material such that the first building material and the second building material are separated by a distance to create a sound trap space, and wherein the first building material comprises a core matrix disposed on a facing material. The core matrix can include a plurality of microspheres and a binder configured to support the micro spheres, wherein a side of the first building material core matrix facing the second building material is exposed to create an at least substantially exposed face of the first building material to increase sound attenuation by reducing reflections from sound waves impinging on the first building material as compared to a control building material lacking an exposed face. In a more specific aspect, a building structure can be located within the sound trap space. In another more specific aspect, the first building material is supported about a first side of the building structure and the second building material is supported about a second side of the building structure. In yet another more specific aspect the first building material, the second building material, and the building structure form a walled partition. In some aspects, an insulation material can be disposed within the sound trap between the first building material and the second building material.

Numerous configurations for the second building material are contemplated. In one aspect, for example, the second building material includes a core matrix disposed on a facing material, where the core matrix includes a plurality of micro spheres and a binder configured to support the microspheres. In a specific aspect, a side of the second building material core matrix facing the first building material is exposed to create an at least substantially exposed face of the second building material to increase sound attenuation by reducing reflections from sound waves impinging on the second building material as compared to a control building material lacking an exposed face. Alternatively, the side of the second building material core matrix facing the first building material can be substantially covered.

The present invention additionally provides a method of attenuating sound with a building material. Such a method can include introducing sound waves into the sound trap as described herein, such that the sound waves are attenuated by passing at least partially through at least one of the first building material core matrix and the second building material core matrix. In a further aspect, the sound waves are attenuated by passing at least partially through both the first building material core matrix and the second building material core matrix. In yet another aspect, the sound waves are at least partially attenuated as a result of reduced reflections from the sound waves impinging on the exposed face of the first building material as compared to a control building material lacking an exposed face.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 6 illustrates a detailed perspective view of a wallboard building material in accordance with one exemplary embodiment of the present invention, wherein the building material comprises a microparticle-based core matrix, a multi-elevational surface configuration formed in one surface of the core matrix, and a facing sheet disposed on an opposing surface of the core matrix;

FIG. 7-A illustrates a detailed perspective view of a wallboard building material in accordance with another exemplary embodiment of the present invention, wherein the building material comprises a microparticle-based core matrix, a lath disposed or sandwiched within the core matrix, a multi-elevational surface configuration formed in one surface of the core matrix, and a facing sheet disposed on an opposing surface of the core matrix;

FIG. 7-B illustrates a detailed view of the building material of FIG. 7-A;

FIG. 11 illustrates a detailed side view of the building material of FIG. 6;

FIG. 12 illustrates a detailed side view of a building material having a multi-elevational surface configuration in accordance with another exemplary embodiment;

FIG. 13 illustrates a detailed side view of a building material having a multi-elevational surface configuration in accordance with another exemplary embodiment;

FIG. 14 illustrates a cross-sectional side view of a building material in accordance with another exemplary embodiment, wherein the building material comprises a plurality of strategically formed and located cavities or voids.

DETAILED DESCRIPTION OF EXEMPLARY EMBODIMENTS

Figure 1:
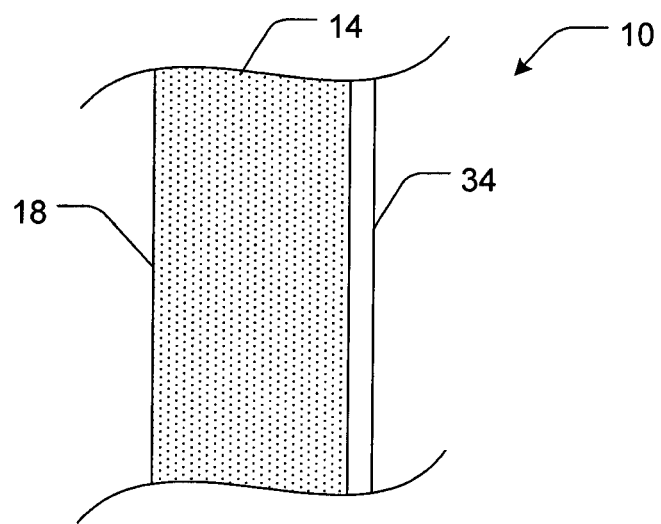
FIG. 1 illustrates a detailed perspective view of a building material in accordance with one exemplary embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

In describing and claiming the present invention, the following terminology will be used in accordance with the definitions set forth below.

The singular forms "a," "an," and, "the" include plural referents unless the context clearly dictates otherwise. Thus, for example, reference to "a wallboard" includes reference to one or more of such wallboards, and reference to "the binder" includes reference to one or more of such binders.

For purposes of discussion and interpretation of the claims as set forth herein, the term "building material," as used herein, shall be understood to mean various types of products or materials incorporating a matrix of microparticles (e.g., microspheres) adhered or bound together using one or more components, such as a binder of some kind. The building materials may comprise other additives, components or constituents, such as setting agents, foaming agents or surfactants, water soluble polymers, and others. The building materials may comprise many different types, embodiments, etc., and may be used in many different applications.

The term "microparticle," as used herein, shall be understood to mean any naturally occurring, manufactured, or synthetic particle having an outer surface, and in some cases, a hollow interior. Generally, the microparticles referred to herein comprise a spherical or substantially spherical geometry having a hollow interior, known as microspheres. Other types of microparticles may include those made from wood, ground rubber, ground up plastic, sawdust, etc.

The term "core matrix," as used herein, shall be understood to mean the combination of microparticles and other constituents used to form the support matrix of the building materials. The microparticles may be combined with one or more binders, additives, setting agents, etc.

The term "multi-elevational" shall be understood to describe at least one surface of the core matrix of the building material, wherein the surface has formed therein a series of peaks and valleys (or protrusions and recesses) to provide an overall surface configuration having different surfaces located in different elevations and/or orientations. The multi-elevational surface configuration may be arbitrarily formed or patterned. In addition, the multi-elevational surface may be defined by any arbitrary or geometrically shaped protruding and recessed components.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The present invention describes various utility materials formulated using a plurality of microparticles. The present invention also describes a various methods used to produce or fabricate different utility materials, as well as various applications for such utility materials. The presently disclosed utility material, associated wallboard embodiments, and associated methods of making and using such utility materials provide several significant advantages over prior related utility materials, such as, e.g., wallboard products, and particularly drywall, some of which are recited here and throughout the following more detailed description. First, the wallboard building material provides enhanced thermal properties. For example, in one aspect, the wallboard building material provides a much greater resistance to thermal heat transfer. Second, in another aspect, wallboard building material provides enhanced acoustical properties. For example, the wallboard building material disclosed herein, provides a significantly better Sound Transmission Class (STC) rating. Third, the present invention wallboard building material is stronger and lighter. These advantages are not meant to be limiting in any way. Additionally, one skilled in the art will appreciate that other advantages may be realized, other than those specifically recited herein, upon practicing the present invention.

Utility materials, as disclosed herein, are highly adaptable to a variety of applications. Utility materials, due to their composition or makeup, can be manipulated to achieve different performance characteristics depending upon the intended application for use. For example, it is possible to control the porosity and density of the microparticles to achieve any level desired. This is useful in many applications, such as when a sound or thermal insulating utility material is desired.

In one aspect, for example, the present invention provides a building material having an improved Sound Transmission Class rating and other beneficial properties (e.g., high resistance to thermal heat transfer) over conventional drywall. The building material may be configured as a shear panel, or as a wallboard panel, each comprising a core matrix formed of a plurality of hollow or solid, inert, lightweight naturally occurring or synthetic microparticles, as well as at least one binder or binder solution configured to support (e.g., bond or adhere) the microparticles together, and to form a plurality of voids present throughout the core matrix. The microparticles are thus interspersed and suspended in a composition, comprising at least the binder, and perhaps other ingredients, such as a surfactant or foaming agent. The binder may comprise an inorganic binder solution, an organic or latex binder solution, or a combination of an inorganic binder solution and an organic binder solution. The core matrix may also comprise various additives, fillers, reinforcement materials, etc. Depending upon the selected composition, the utility materials may be configured to exhibit certain physical and performance properties in addition to acoustic attenuation properties, such as strength, flexibility, hardness, as well as thermal properties, fire resistant properties, etc.

In the case of a wallboard panel, the core matrix may be disposed about a facing material on one side or about one face, with the opposing side or face of the wallboard panel left uncovered, or at least partially uncovered to provide a rough, porous surface defined by the composition and configuration of the core matrix. In other words, the building material is configured with the core matrix at least partially exposed. In the case of a shear panel, the core matrix may be disposed about a facing material with the opposing side exposed. The facing material may be any useful material such as paper, cloth, polymer, metal, etc. Each of the components of the present invention sound attenuation building material and system, as well as other features and systems, are described in greater detail below.

The exposed surface of the core matrix has now been found to greatly increase the sound attenuation properties of the building material. Sound waves impinging on the exposed surface exhibit reduced acoustic reflection as compared to a building material lacking such an exposed surface. As a result, sound waves are more effectively absorbed and attenuated by the materials comprising the core matrix of the building material.

With reference to FIG. 1, illustrated is a detailed perspective view of a building material formed in accordance with one exemplary aspect of the present invention. As has been described, the building material comprises an exposed face or side to provide a rough, porous surface. As shown, the building material 10 is in panel form, similar to a wallboard panel, having a size of approximately 4 ft. in width, and 8 ft. in length, which is the same size as most conventional wallboard products. Of course, building material sizes other than 4 ft. by 8 ft., as well as different thicknesses, are also contemplated. The building material 10 is shown as comprising a core matrix 14 disposed about a single facing sheet or layer, namely facing material 34. An exposed side 18 of the core matrix 14 allows sound to be attenuated by the microparticles and binder with less acoustic reflection than would be seen if both sides of the building material 10 were covered with a facing material. In one aspect, the exposed side 18 of the core matrix 14 can face inward as the building material is installed or mounted to a structure, such as a stud wall, with the facing membrane 34 facing out. In another aspect, the exposed side 18 of the core matrix 14 is can face outward as the building material is installed or mounted to a structure, with the facing membrane 34 facing in.

The core matrix 14 is comprised of a plurality of microparticles and at least one binder, wherein the microparticles are at least bound or adhered together, and in some cases bonded together, by the one or more binders to create a core matrix structure having a plurality of voids defined therein. The voids are formed from the point to point contact between the microparticles as secured in place by the binder. The microparticles, as bonded together, provide a significantly more rough surface than if the building material were to comprise an additional facing membrane. The presence of a rough, porous surface functions to significantly improve the sound attenuation properties of the building material by being able to better absorb sound as it attempts to pass through the core matrix.

The microparticles contemplated for use herein may comprise many different types, sizes, shapes, constituents, etc. In one aspect the microparticles can be microspheres. In one aspect, the microparticles used in the present invention building material can have an average size ranging between about 10 and about 1500 microns. In another aspect, the microparticles can have an average size ranging between about 10 and about 1000 microns. In yet another aspect, the microparticles can have an average size ranging between about 200 and about 800 microns. In yet another aspect, the microparticles can have an average size ranging from about 300 to about 600 microns. In a further aspect, the microparticles can have an average size ranging from about 350 microns to about 450 microns. Furthermore, the microparticles can have a bulk density of from about 0.4 to about 0.6 g/ml, thus providing products that are much lighter than conventional building materials such as gypsum-based drywall or oriented strand board (OSB). The size of the microparticles may thus depend upon the application and the performance characteristics desired. However, the microparticles should not be too large so as to cause any binder disposed thereon to run off or to not be effective.

The size of the microparticles will also function to influence the permeability of the building material. The microparticles are intended to be compatible with any binders, additives, and/or facing sheets. In the case of hollow microparticles, the shell thickness may be kept to a minimum amount, provided the microparticles maintain structural integrity as desired in the core matrix material. In one aspect, the microparticles can have a shell thickness of less than about 30% of the diameter of the microparticle. For non-spherical microparticles, the diameter of the particle can be calculated based on the effective diameter of the particle, using the total area of the cross section of the particle and equating such area to a circumferential area and determining the diameter from that value. In a further aspect, the shell thickness can be less than about 20% of the diameter of the microparticle.

In one exemplary aspect, the microparticles may comprise hollow, inert, lightweight naturally occurring, glass particles that are substantially spherical in geometry. One particular type of microsphere is sold under the trademark Extendospheres™, which are manufactured and sold by Spear One Corporation. In some aspects a hollow interior can be beneficial in order to reduce the weight of the building material, as well as provide good insulating properties. In one aspect, the microparticles can be the naturally occurring hollow, inert, glass microspheres obtained from a fly ash byproduct. Such microspheres are often referred to as cenospheres. Cenospheres may be separated from other byproduct components present in fly ash and further processed, such as to clean and separate these into desired size ranges. Cenospheres are comprised primarily of silica and alumina, and may have a hollow interior that is filled with air and/or other gasses. They possess many desirable properties, such as a crush strength between 3000 and 5000 psi, low specific gravity, and properties that allow the endurance of high temperatures (above 1800° F.). Although they are substantially spherical in overall shape, many are not true spheres, as many are fragmented, or comprise unsmooth surfaces caused by additional silica and/or alumina.

As was noted, microparticles or microspheres can include an amount of air or other gasses within the hollow interior. Where possible, the composition of the gaseous material within the microsphere can optionally be selected so as to provide enhanced characteristics of the utility material. For example, the hollow interior can include a noble gas or other known insulating gasses, such as argon, to improve the insulating properties of the overall utility material.

In another aspect, the microparticles may comprise hollow, spherical structures manufactured from a synthetic material. One advantage of utilizing a synthetic material is the uniformity between microspheres, thus making their behavior and the behavior of the resulting core matrix and building material more predictable. However, in some cases these advantages may not be significant enough to justify their use, as synthetic microspheres are often expensive to manufacture. The use of naturally occurring microspheres over synthetic microspheres to form a building material may depend on several different factors, such as the intended application, and/or desired performance properties or characteristics. In some applications, naturally occurring microspheres may be preferred while in others a synthetic type may be more desirable.

The core matrix materials of the present invention can include microparticles in any amount, depending on the intended properties of the resulting utility material. In one aspect, for example, microparticles can be present in the core matrix in an amount between about 25 and about 60 percent by weight of the total core matrix, in wet mixture form. In another aspect, the microparticles can be present in an amount between about 30 and about 40 percent by weight. Other amounts are further contemplated, particularly in those aspects including other additives or fillers in the core matrix, such as perlite, or setting agents, such as Class C fly ash. It should be noted that fly ash, of any type, can be utilized as a filler material, and/or optionally as a source of cenospheres. In one aspect, Class C fly ash can be one or the only source of microspheres. Class C fly ash can, in one aspect, be included in a core matrix in an amount ranging from about 0.5 wt % to about 50 wt %. In another aspect, it can be present in combination with synthetically made microspheres at a ratio of Class C fly ash to synthetic microspheres of about 1:15 to about 15:1. In yet another aspect, Class C fly ash can be present in an amount of less than about ⅓ of the amount of microspheres. The Class C fly ash used can optionally include greater than about 80 wt % calcium aluminate silicates, and less than about 2 wt % lime.

As has been described, the present invention further comprises one or more binders operable to couple together the microparticles, and to facilitate formation of the porous core matrix. The microparticles can be bound by any manner, including a physical cementing arrangement, chemically binding microparticles, merging boundaries of microparticles, etc. In a specific aspect, the microparticles can be bound by a physical cementing arrangement, as held together in a matrix of binder, wherein the binder adheres or physically immobilizes the microparticles, but does not form covalent or other chemical bonding with the microspheres. The binder may cause the microspheres to adhere together, wherein the binder is allowed to dry if water based, or cured in a high temperature environment if non-water based. In one aspect, the binder may be caused to be cross-linked, wherein the binder functions to bond the microparticles together and to improve the water resistant properties of the building material.

The ratio of binder to microparticles may vary depending upon the building material to be formed. A higher ratio of binder to microparticles will result in a building material that is more solid and dense than one with a smaller ratio. A smaller ratio of binder to microparticles will result in a more porous building material.

Numerous binder materials are contemplated for use in aspects of the present invention. It should be noted that any binder capable of binding a plurality of microparticles together into a core matrix should be considered to be within the present scope. Different binders may be selected as part of the composition to contribute to the makeup of the resulting building material and to help provide the building material with certain physical and performance properties. Both water-based and non-water-based binders are contemplated for use. Examples of general binder categories include, but are not limited to, thermoplastics, epoxy resins, curatives, urethanes, thermosets, silicones, and the like.

In one exemplary embodiment, the binder comprises an inorganic binder, such as sodium silicates in one form or another, combined with an organic binder such as polyvinyl acetate copolymer or ethylene vinyl acetate. The ratio of these binders may vary. In one aspect, the ratio of inorganic binder to organic binder may be about 7:1 to about 10:1. Stated more generally, the inorganic binder may be present in an amount between 50 and 60 percent by weight of the total weight of the core matrix (or about 20 to about 36 wt % dry inorganic binder), in wet form (the binders comprise an amount of water, or are mixed with an amount of water), with the organic binder present in an amount between 5 and 15 percent by weight of the total weight of the core matrix, in wet form (or about 2 to about 6 wt % dry organic binder). The listed amounts can be based on the pure forms of the binder material (with the percent weight of the binders in the total core matrix discussed herein being reduced between 40 and 60 percent), e.g. on pure sodium silicate, or can be based on binder mixtures including optionally water, similar chemical forms, e.g. silicates, silicic acid salts, etc., and other additives. As a non-limiting example, a sodium silicate binder solution commercially sold includes from about 35 wt % to 40 wt % sodium silicate in solution. Furthermore, more than one type of inorganic and/or organic binder can be utilized simultaneously.

Numerous compositions of materials making up the core matrix are contemplated, depending on the desired properties of the resulting utility material. In a specific embodiment, the core matrix composition can contain between 400 g and 600 g of microspheres, mixed with between 600 g and 800 g of sodium silicate binder solution, and between 60 g and 100 g of ethylene vinyl acetate. Of course, other ranges are possible, depending upon the application. For example, it may be desirable to have between 200 g and 1500 g of sodium silicate or other binder mixed with between 300 and 800 g of microspheres, mixed with between 20 g and 180 g of ethylene vinyl acetate copolymer. Other ratios and ranges of each of the components of various compositions are contemplated. Furthermore, more than one organic binder could be used, as could more than one inorganic binder.

In one specific example, the inorganic binder solution is present in an amount about 55.5% by weight of the total weight of the core matrix in wet mixture, with the binder solution comprising sodium silicate and water. More specifically, the inorganic binder solution comprises sodium silicate present in an amount between about 40% and about 60% by weight and water present in an amount between about 40% and about 60% by weight. In many cases, the inorganic binder solution will comprises a 1:1 ratio of sodium silicate to water. The sodium silicate may be pre-mixed and the solution provided in liquid, or the sodium silicate may be in powder form and subsequently mixed with water.

In one aspect, a latex or organic binder can be present in an amount about 7.4% by weight of the total weight of the core matrix in wet mixture, and comprises a ethylene polyvinyl acetate (EVA) emulsion. The latex binder facilitates formation of a flexible, porous composition that is subsequently formed into the core matrix of the wallboard. One particular example of latex binder used is ethylene vinyl acetate (water-based binder) sold under the trademark Airflex (e.g., Airflex 420), which is manufactured and sold by Airproducts, Inc. This particular binder can be used to facilitate a flowable and formable formation of the core matrix, as well as to provide either flexible or semi-rigid compositions. The latex binder can be pre-mixed with water to be in liquid form. The latex binder comprises EVA present in an amount about 40% by weight, and water present in an amount about 60% by weight. In one aspect, the latex binder can range from about 2.5 wt % to about 30 wt % of the total weight of the core matrix in wet mixture. In a further aspect, the latex binder can range from about 5 wt % to about 20 wt %. Non-limiting examples of latex binders include those produced by Airflex (including specifically 323, 401, 420, 426), those produced by UCAR (specifically 154s, 163s), conventional glues and pastes, those produced by Vinac (including XX210), and mixtures and combinations thereof.

A water soluble polymer can be included in the core matrix formulation. The water soluble polymer may be added to the core matrix composition already dissolved in water or in dried form. The function of the water soluble polymer is to serve as a stabilizer for any surfactant or foaming agent present in the mixture. Specifically, the water soluble polymer helps to stabilize the composition until the binder is either cured or cross-linked. Non-limiting examples of water soluble polymers that can be included in the formulation include those distributed by Airflex, such as polyethylene oxide (e.g., WSR 301). The water soluble polymer can also function as a thickener and prevent water from running out of the mixture during core matrix formation. Such polymers can be useful to control the stiffness, flexibility, tear strength, and other physical properties of the building material, as well as to stabilize any surfactants, if present. In some embodiments, it may be desirable to eliminate, or at least significantly reduce, the amount of organic component in the core matrix composition. This is particularly the case in the event it is desirable that the building material comprise more enhanced fire resistant properties. The amount of organic component remaining in the core matrix composition may thus be dependent upon the particular application.

As has been described, and depending upon the type used, the binder may be simply cured, with no cross-linking, or it may be cross-linked. By cross-linking the binder(s), a stronger more permanent physical coupling occurs between the binder and the microspheres. As such, the present invention contemplates using one or more means to effectively cross-link the binders. In one exemplary embodiment, the binders may be cross-linked by elevating the temperatures of the binders to a suitable temperature for a suitable period of time to effectuate polymerization and bonding. This may be done using conventional radiant heating methods, or it may be done using microwaves applied continuously or at various intervals, as well as with microwaves of different intensities. Using microwaves is significantly faster, and much more cost effective. In addition, cross-linking with microwaves functions to produce a stronger building material as the amount of binder actually cross-linked is increased. Additionally, depending of the particular binder used, chemical crosslinking agents can be utilized. Such chemical croslikers are well known in the art.

Cross-linking within a building material provides significant advantages over a building material having a composition that is not cross-linked. For example, with cross-linking, the binders are made stronger, they do not absorb water as easily, and the connection between microspheres is much stronger. In addition, the building material often weakens less over time. Other advantages may be realized by those skilled in the art. It should be noted, however, that there may be applications where cross-linking is not desirable, and where a non-bonded composition may be preferred.

The present invention further contemplates utilizing a surfactant or foaming agent, mixed with the binder and the microspheres to achieve a building material having a relatively low density. With respect to a foaming process, once ingredients are combined, they can be whipped or agitated to introduce air into the mixture, and then dried. Mechanical agitation or compressed air may be used to physically introduce air into the mixture and to create the foaming process. The foaming process effectively causes microparticles to be supported in a much more separated position with respect to one another as compared to a non-foamed composition. With the presence of the foam, the microparticles are suspended and are thus able to dry in more dispersed configurations. In another aspect, the suspension of the microspheres due to the presence of the foaming agents may also function to make certain core matrix compositions more flowable or pumpable, as well as more formable. Examples of suitable surfactants or foaming agents include, but are not limited to, anionic foaming agents, such as Steol FS406 or Bio-terge AS40, cationic foaming agents, and non-ionic foaming agents, etc.

As a specific example, the core matrix material can include from about 25 wt % to about 60 wt % of microparticles based on wet formulation, where the microparticles having a size of from about 10 to about 1000 microns, from about 20 wt % to about 36 wt % sodium silicate, and from about 5 wt % to about 15 wt % of a vinyl acetate.

The facing material may comprise many different types of materials or combination of materials having diverse properties. In one exemplary aspect, the facing material can be a paper material similar to that found on various wallboard products, such as drywall or the wallboard incorporated by reference herein, as noted above. In another exemplary aspect, the facing material can be a cloth, a polymer, or a metal or a metal alloy.

Figure 2:
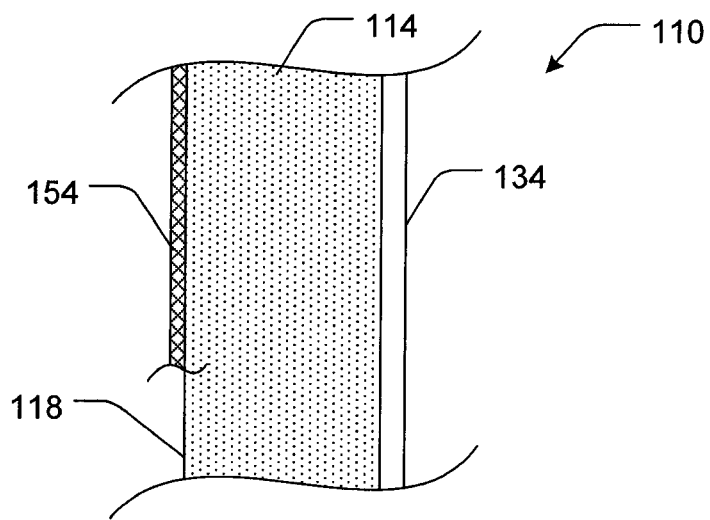
FIG. 2 illustrates a detailed perspective view of a building material in accordance with another exemplary embodiment of the present invention.

With reference to FIG. 2, shown is a building material formed in accordance with another exemplary embodiment of the present invention. The building material 110 is similar in many respects to the building material 10 discussed above and shown in FIG. 1. However, building material 110 comprises a mesh membrane 154 disposed about the exposed side 118 of the core matrix 114, opposite the facing membrane 134. The mesh membrane 154 comprises a plurality of intersecting members forming a plurality of grid-like openings. The mesh membrane 154 functions to provide support and stability to the core matrix 114 similar to facing membrane 134, but still leaves a substantial portion of the core matrix 114 exposed on that side to maintain the rough, porous surface of the building material 110. The mesh membrane 154 may numerous different types of materials, and the grid-like openings may be of many different sizes and configurations.

In one aspect, the mesh membrane 154 may comprise a fiberglass or plastic mesh or mesh-like material. This reinforcing mesh material gives flexural strength to the building material 110, and further supports the microparticles as they are exposed on one side of the building material 110 for the specific purpose of receiving and dissipating sound by absorbing sound waves and dampening vibration. The mesh membrane 154 may be made from glass, plastics (e.g., extruded plastics), or other materials, depending upon the particular application and need. The mesh membrane 154 may be bound to the core matrix 114 in a similar way as the facing membrane 134, or by any other method known in the art.

One significant advantage over conventional products is the ability for the present invention building material to attenuate or absorb sound. The Sound Transmission Class rating was found to be between 40 and 60 for a building material formed similar to that shown in FIGS. 1 and 2 (having a thickness of ½ inch), depending upon the composition of the core matrix, the thickness of the wallboard panel, and whether or not a reinforcing material was present. Conventional drywall, also ½ inch thick, has an STC rating of about 33. In testing a building material based on the embodiments described above, and shown in FIGS. 1 and 2, it was discovered that a sound absorption of around 0.89±0.10 could be reached. In addition, at 3000 Hz, noise reduction was between 55 and 65 dB. At 2000 Hz, noise reduction was between 35 and 45 dB. At 1000 Hz, noise reduction was between 10 and 20 dB. In comparison, drywall had a noise reduction of 40 dB at 3000 Hz; a noise reduction of 28 dB at 2000 Hz; and a noise reduction of 3 dB at 1000 Hz. As can be seen, the building material is significantly better at absorbing sound.

Besides its improved or enhanced sound attenuation properties, the present invention building material provides many additional improved properties and characteristics over conventional building materials, such as drywall, gypsum, OSB. For example, the present invention building material has a significantly lower heat transfer than conventional building materials. For example, in the building material discussed above and shown in FIGS. 1 and 2, a 400° C. temperature gradient may be achieved. In one particular test, one side of the present invention building material was heated to 100° C. with no noticeable temperature increase on the opposite side after 2 hours. This temperature gradient may range or vary depending upon the makeup of the composition, such as the ratio of microspheres to binder, the type of binder(s) used, the presence of a reinforcing material, etc. as discuss herein. It can thus be seen that the building materials of the present invention exhibit excellent thermal properties. Using standardized ASTM testing, the building material was found to have a 20° C. less heat transfer under the same testing conditions (e.g., time and temperature) than drywall. Tests have shown that the building material absorbs approximately 0.11 BTU, as compared to drywall which absorbs approximately 0.54 BTU. As such, the heat capacity, namely how much heat the material absorbs, is enhanced using a microsphere-based core matrix. The thermal resistance, or R-value, of the same building material has been discovered to be between 2 and 3 for a ½ inch thick panel, as compared to drywall, which is 0.45 for a ½ inch thick panel.

The same building material described above was additionally discovered to be between 20% and 30% lighter than drywall. For example, a 4×8 panel weighs about 39 lbs, compared with a similarly sized drywall panel which weighs approximately 51 lbs. A 4×12 drywall panel weighs approximately 80 lbs, compared with a present invention wallboard building material, which weighs approximately 60 lbs.

In addition to weighing less, it has been discovered that the same building material is between 10% and 20% stronger than drywall. In one example, various tests revealed that the building material will break between 170 lbs and 180 lbs in a flexure strength test. In comparison, drywall typically breaks around 107 lbs. The panels used in these tests were of comparable size and thickness. In an edge hardness test, the building material averaged approximately 15 lbf, while drywall tested at 11 lbf. In a nail pull test, the building material tested an average of 99 lbf, while gypsum tested at 77 lbf.

The building material of the present invention may further comprise a rigid material or a reinforcing member configured to provide enhanced characteristics in one or more areas as compared with the exemplary building material of FIGS. 1 and 2. In one exemplary embodiment, the building material may comprise a rigid material disposed within the core matrix (sandwiched therein), or between the outer surface of the core matrix and a facing material. The rigid material may be configured to reinforce or enhance one or more properties or characteristics of the building material. For example, the rigid material may be configured to reinforce against (or improve the resistance of) sound transmission, heat transfer, or a combination of these. The rigid material may also be configured to enhance the overall strength of the building material. The rigid material may comprise various types of materials, such as metals, woven or nonwoven fibers or fiber sheets, plastic films, etc., and may comprise any necessary thickness.

The present invention also provides systems and methods for improving and enhancing the noise reduction across a walled partition using a sound trap. Such a sound trap can be created by disposing present invention building materials about a building structure such as a stud or other wall, wherein the opposing building materials create the sound trap configured to absorb sound and to significantly reduce sound transmission across the wall. In this configuration, opposing exposed surfaces would be positioned to face one another. The sound attenuation system may be formed by a number of properly situated present invention building materials having a number of configurations. As such, those specifically presented herein are not intended to be limiting in any way.

In general, sound waves entering the sound trap are attenuated by the associated building materials with varying degrees of acoustic reflection, depending on the configuration of the sound trap and the building materials used. As has been described, the exposed surface of the core matrix greatly increases the sound attenuation properties of the building material. Sound waves impinging on the exposed surface exhibit reduced acoustic reflection as compared to a building material lacking such an exposed surface. As a result, sound waves are more effectively absorbed and attenuated by the materials comprising the core matrix of the building material. For a sound trap having surrounded by building materials having exposed faces, sound attenuation is increased by all the building materials in the sound trap. For sound traps utilizing a first building material having an exposed face on one side and a second building material having a facing material opposite the exposed face of the first building material, sound may be attenuated primarily by the exposed face of the first building material while the facing material of the second building material functions to reflect sound waves into the exposed face of the first building material. Thus for both configurations, sound waves are trapped and effectively attenuated between the building materials.

In an alternative embodiment, a sound trap can be constructed using two facing building material panels, each containing the core matrix material as described herein sandwiched between two facing material layers. The facing material layers can be made from a variety of materials, as has been described herein, such as paper, cloth, metal and metal alloys, polymeric materials, and combinations thereof.

Figure 3:
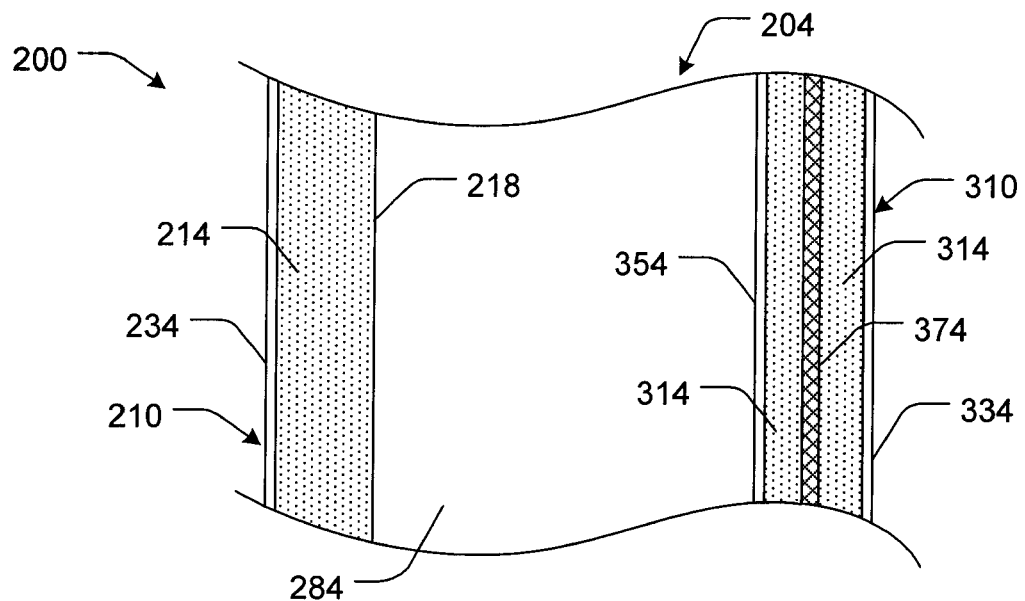
FIG. 3 illustrates a partial side cross-sectional view of an exemplary sound attenuation system in the form of a walled partition formed in accordance with one exemplary embodiment, wherein the walled partition is formed from opposing exemplary building materials, and wherein the walled partition creates and defines a sound trap.

With reference to FIG. 3, illustrated is a sound attenuation system 200 in accordance with one exemplary embodiment of the present invention, wherein the sound attenuation system creates and defines an exterior walled partition 204. The sound attenuation system 200, and the exterior walled partition 204, comprises a first building material 210 supported about a first side of building structure, such as an exterior stud wall (not shown), and a second building material 310 supported about a second side of the building structure opposite the first building material 210. In this case the second building material is a shear panel having a rigid material disposed therein. The first and second building materials are supported or mounted to the building structure in accordance with practices commonly known in the art.

The first building material 210 comprises a wallboard panel, and has a core matrix 214 disposed about a facing membrane 234, with one side 218 of the core matrix exposed, or at least substantially exposed. The exposed side 218 of the core matrix faces inward, and is placed against the components making up the stud wall, with the facing membrane 234 facing outward. The second building material 310 comprises a shear panel, and has a core matrix 314 disposed between a first facing membrane 334 formed of a metal, such as aluminum, and a second facing membrane 354 formed of a paper material. Optionally, the wallboard building material 210 and/or the shear panel building material 310 may comprise a rigid material 374 sandwiched between the core matrix 314 of the shear panel building material 310.

Mounted in this configuration on the stud wall, the wallboard building material 210 and the shear panel building material 310 function together to provide and define a volume of space or sound trap 284, extending between the inner surfaces of each building material within the building structure. This sound trap is intended to resist the transmission of sound waves across the walled partition 204 in either direction as these are caused to be absorbed more efficiently by the core matrix 214, facilitated by the exposed rough surface 218 of the wallboard building material 210. Sound waves originating indoors and traveling through the wallboard building material 210 toward the shear panel building material 310 are partially absorbed and partially deflected by the shear panel building material 310. Those sound waves that are deflected travel towards the exposed side 218 of the core matrix 214 of the wallboard building material 210 where they encounter the rough, porous surface of the exposed side 218. Due to the rough, porous configuration, much of the sound is absorbed into the core matrix and attenuated. The core matrix 314 of the shear panel building material 310 also contributes to the absorption and attenuation of the sound as well. As such, the sound attenuation system 200, and particularly the walled partition 204, provides both a higher STC and OITC rating over exterior walled partitions formed from conventional drywall and OSB material. Adding insulation to the present invention walled partition would further enhance the STC and OITC ratings over a walled partition of drywall, OSB and insulation.

Figure 4:
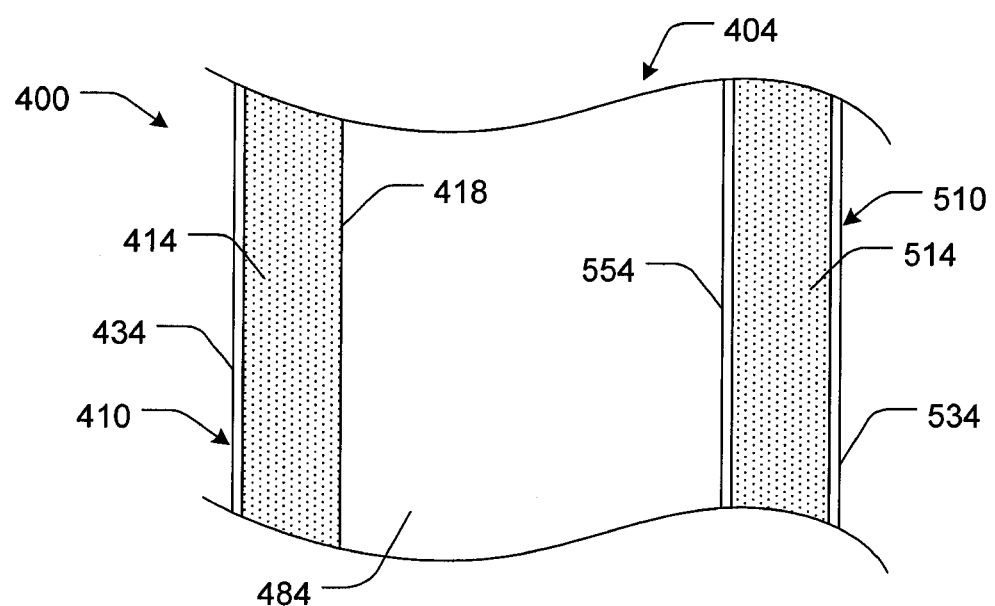
FIG. 4 illustrates a partial side cross-sectional view of an exemplary sound attenuation system in the form of a walled partition formed in accordance with another exemplary embodiment, wherein the walled partition is formed from opposing exemplary building materials, and wherein the walled partition creates and defines a sound trap.

FIG. 4 illustrates a sound attenuation system 400 in accordance with one exemplary embodiment of the present invention, wherein the sound attenuation system creates and defines an interior walled partition 404. The sound attenuation system 400, and the interior walled partition 404, comprises a first building material 410 supported about a first side of a building structure, such as an interior stud wall (not shown), and a second building material 510 supported about a second side of the building structure opposite the first building material 410 to define sound trap 484. The first building material 410 is similar to the first building material 210 of FIG. 3, which description above is incorporated here. The second building material 510 is also similar to the first building material 210 of FIG. 3, but is different in that wallboard building material 510 comprises a core matrix 514 disposed between a first facing sheet 534 and a second facing sheet 554. In other words, no side of the core matrix 514 of the second building material 510 is exposed, but rather covered. The sound absorption and attenuation properties of the sound attenuation system 400 are enhanced by the direct and deflected sound waves penetrating the exposed side 418 of the first wallboard building material 410, where they are dampened and at least partially absorbed by the core matrix 414, the sound waves being trapped in the sound trap 484.

Figure 5:
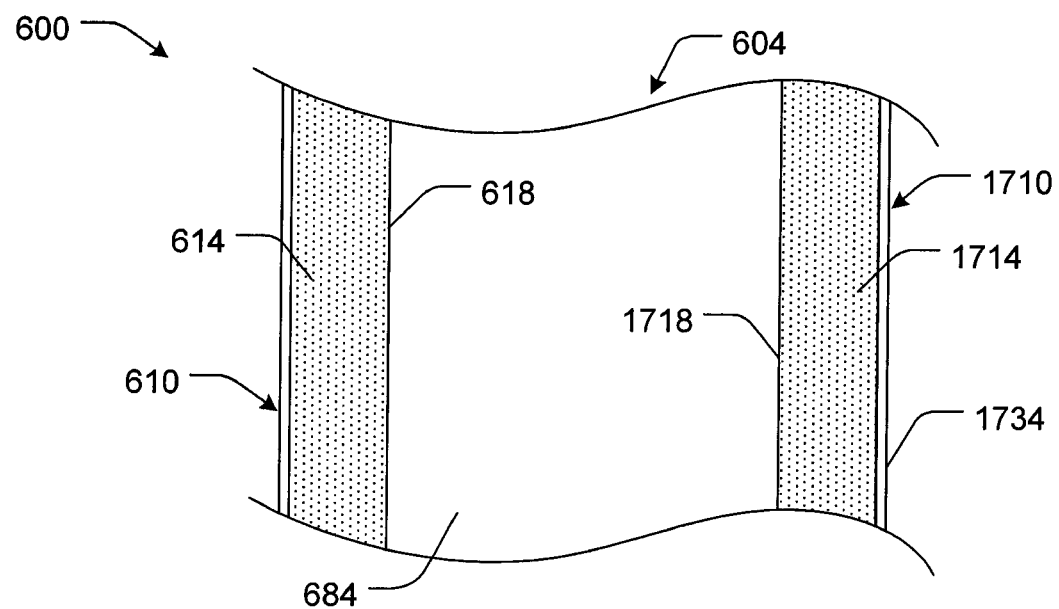
FIG. 5 illustrates a partial side cross-sectional view of an exemplary sound attenuation system in the form of a walled partition formed in accordance with still another exemplary embodiment, wherein the walled partition is formed from opposing exemplary building materials, and wherein the walled partition creates and defines a sound trap.

FIG. 5 illustrates a sound attenuation system 600 in accordance with one exemplary embodiment of the present invention, wherein the sound attenuation system 600 also creates and defines an interior walled partition 604. The sound attenuation system 600, and the interior walled partition 604, comprises a first building material 610 supported about a first side of building structure, such as an interior stud wall (not shown), and a second building material 1710 supported about a second side of the building structure opposite the first material 610 to define sound trap 684. First and second building materials 610 and 1710 are similar to one another, with each comprising a core matrix 614 and 1714, respectively, and each having an exposed side 618 and 1718, respectively. Both exposed sides 618 and 1718 operate to receive and absorb sound, thus trapping a substantial portion of the sound waves within the sound trap 684, and preventing their transmission out of the sound trap 684. As such, the sound attenuation system comprises a significantly higher STC rating than a walled partition with standard drywall.

In each of the above exemplary sound attenuation systems, sound is designed to penetrate the outer layers or membranes of the various building materials and to become trapped in the created sound trap, thus significantly reducing sound transmission across the walled partition, whether the partition is an interior or exterior wall. It should be noted that the sound trap can also be created and defined about a ceiling or any other partition, as will be recognized by those skilled in the art. Sound waves that enter the sound trap are attenuated by their acting on and penetrating the exposed side of at least one of the building materials. The rough, porous surface of the exposed core matrix functions to reduce deflection and transmission of the sound waves, with the core matrix, as a whole, operating to at least partially absorb and dampen the sound waves that were not deflected. The thickness of the core matrix of the building materials will affect the noise reduction or sound transmission properties, as will the composition, density, and configuration of the core matrix.

It is contemplated that any combination of present invention building materials may be used on either side of a building structure to create and define a sound trap, including the various embodiments disclosed in the applications incorporated by reference herein. In addition, it is contemplated that the present invention building materials may be manufactured in accordance with that taught in the applications incorporated herein.

In some aspects the core matrix can be constructed to further enhance the sound attenuating properties of the building materials. In one aspect, the present building material comprises an exposed face or side to provide a rough, porous surface. In addition, the present building material comprises an exposed core matrix surface having a multi-elevational surface configuration formed therein.

As shown in FIG. 6, the building material 710 is in panel form, similar to a wallboard panel, having a size of approximately 4 ft. in width, 8 ft. in length and ½ in. in thickness, which is the same size as most conventional wallboard products. Of course, other sizes such 4 ft. by 8 ft. sizes, as well as different thicknesses is also contemplated. The building material 710 is shown as comprising a core matrix 714 disposed about a single facing sheet or layer, namely facing material 734. The other side 718 of the core matrix 714 is exposed, thus exposing a portion of the configuration of microparticles and binder. The exposed surface of the core matrix provides and defines a rough, porous surface that is designed and intended to better attenuate sound. In one aspect the exposed side 718 of the core matrix 714 is intended to face inward as the building material is installed or mounted to a structure, such as a stud wall, with the facing membrane 734 facing out. In another aspect the exposed side 718 of the core matrix 714 is intended to face outward as the building material is installed or mounted to a structure, with the facing membrane 734 facing in.

FIG. 6 further illustrates the exposed side 718 of the core matrix as comprising a multi-elevational surface configuration. The purpose of providing a multi-elevational surface configuration formed about one surface, particularly the exposed surface, of the core matrix is at least twofold; 1) to significantly further enhance the sound attenuation or damping properties of the building material, namely to ensure acoustic isolation and absorption over a wide range of frequencies; and 2) to enhance the flex strength of the building material by eliminating shear lines. As will be described below, many different multi-elevational surface configurations are contemplated herein. Those skilled in the art will recognize the benefits of providing a series of peaks and valleys about a surface to create different surfaces located in different elevations, as well as different surfaces oriented on different inclines, particularly for the specific purpose of attenuating sound. Sound waves incident on these different elevational and/or oriented surfaces are more effectively attenuated.

In the specific embodiment shown, the multi-elevational surface configuration comprises a waffle pattern, with a plurality of protruding members 718, having a square or rectangular cross-section, defining a plurality of recesses 726. This series of peaks and valleys effectively creates a plurality of surfaces (in this case horizontal surfaces 730 and 734) that are located in different elevations about the overall surface of the core matrix 714. In addition, the protruding members 718 may be configured to provide surfaces oriented at different angles (in this case, the protruding members 718 also define several vertically oriented surfaces 738).

It is further contemplated that a separate mesh facing sheet may or may not be disposed over the exposed multi-elevational surface of the core matrix 714. If used, the mesh facing sheet is preferably configured to be flexible to conform to the multi-elevational surface configuration.

FIGS. 6 and 14 further illustrate the building material 710 as comprising a plurality of cavities or air pockets 746 strategically formed and located throughout the core matrix 714, and designed to reduce the overall weight of the building material without significantly affecting the strength or other properties of the building material. Preferably the cavities 746 are randomly located throughout the core matrix 714, but they may also be arranged in a pre-determined pattern. The cavities 746 may be formed in accordance with any known method during the manufacture of the building material. Essentially, the cavities 746 function to define a plurality of voids or air pockets within the core matrix 714 at various locations. The cavities 746 may be sized to comprise a volume between about 0.2 and about 200 $cm^3$, and preferably between about 5 and about 130 $cm^3$. These not only help to reduce weight, but also help to increase the overall R value due to the dead air space. In addition, these help to further attenuate sound as these provide additional surfaces that function to absorb sound waves rather than transmit them.

With reference to FIGS. 7-A and 7-B, shown is a building material formed in accordance with another exemplary embodiment of the present invention. The building material 810 is similar in many respects to the building material 810 discussed above and shown in FIG. 6. However, building material 810 comprises a lath 854 disposed or sandwiched within the core matrix 814. The lath 854 comprises a plurality of intersecting members 856 forming a grid having a plurality of openings 858. The lath 854 functions to provide support and stability to the core matrix 814, as well as additional strength. In addition, the lath 854 increases the mass of the building material 810, which reduces the potential for vibration, thus contributing to the sound attenuation properties of the building material 810. The lath 854 may comprise many different types and configurations, with the grid and openings being of different sizes and configurations. The lath 854 shown in FIG. 7 is not intended to be limiting in any way.

In one aspect, the lath 854 may comprise a metal, fiberglass, or plastic mesh or mesh-like material. This reinforcing lath material provides strength to the building material 810, and further supports the microspheres. The lath 854 may also be made from glass, plastics (e.g., extruded plastics), or other materials, depending upon the particular application and need.

Figure 8:
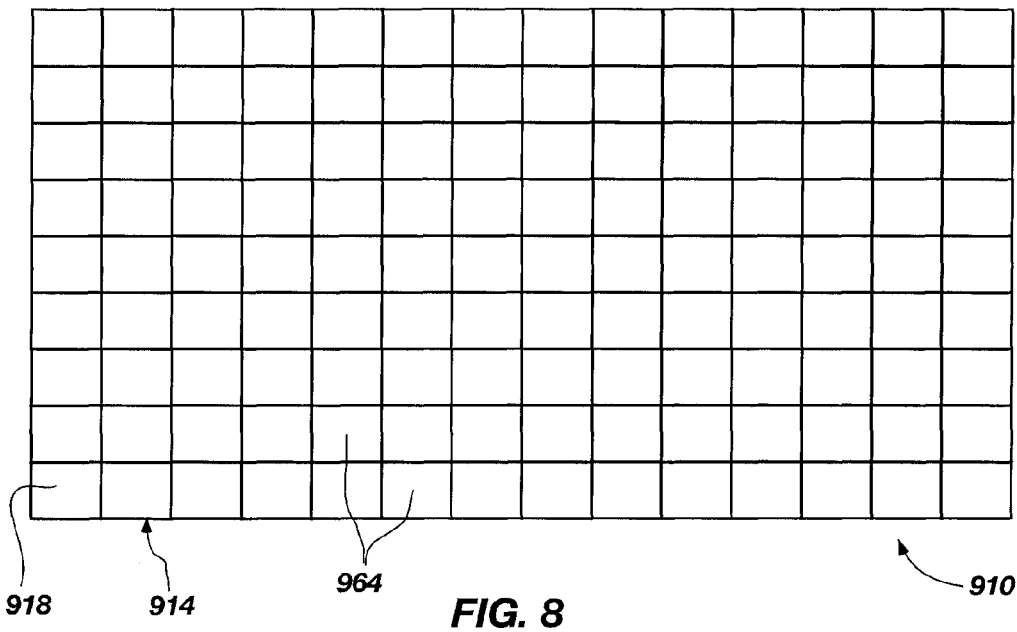
FIG. 8 illustrates a top view of a building material in accordance with still another exemplary embodiment of the present invention, wherein the building material comprises a patterned pillow-like multi-elevational surface configuration formed in the exposed surface of the core matrix.
Figure 9:
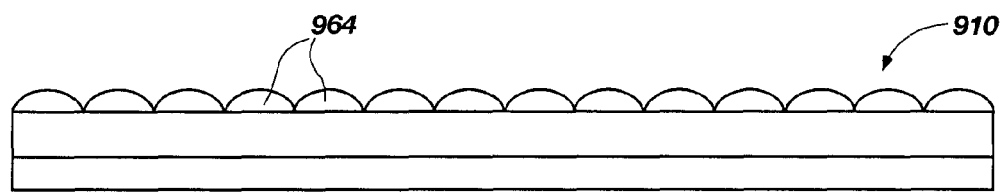
FIG. 9 illustrates a cross-sectional side view of the building material of FIG. 8.
Figure 10:
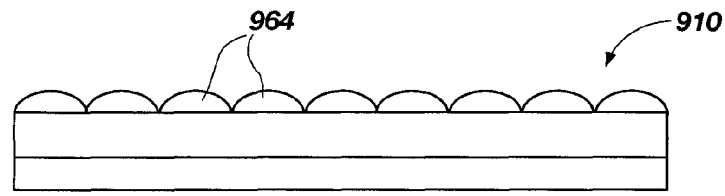
FIG. 10 illustrates a cross-sectional end view of the building material of FIG. 8.
Figure 15:
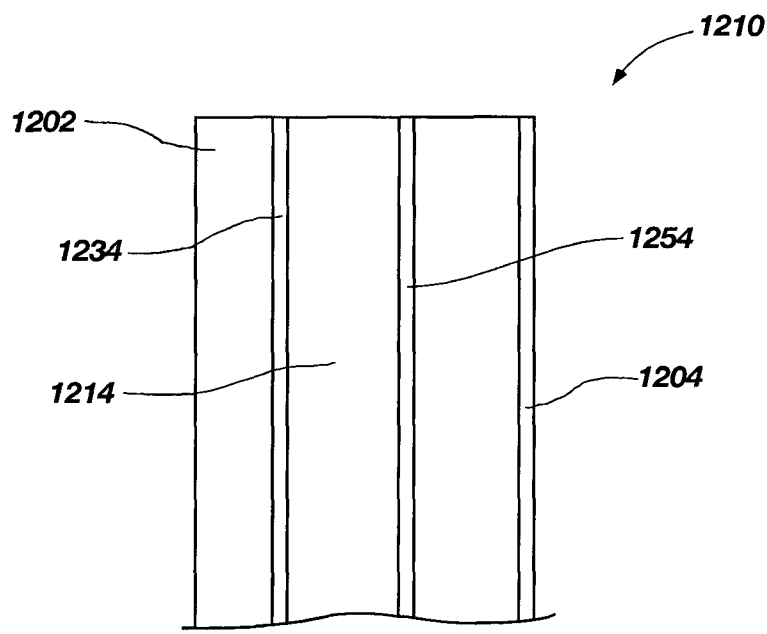
FIG. 15 illustrates a building material configured for use as a finishing material on an exterior of a structure.

With reference to FIGS. 8-10, illustrated is a building material 910 formed in accordance with another exemplary embodiment of the present invention. In this embodiment, the building material 910 comprises a core matrix 914 having a first surface 918. Formed in the first surface 918 is a multi-elevational or nonplanar surface configuration in the form of a repeating pattern of pillow-type protrusions, thus providing multiple different surfaces or surface areas in multiple different elevations. The protrusions may be any desired size, configuration and height. Therefore, those shown in the drawings are intended to be merely exemplary.

With reference to FIG. 11, illustrated is a side view of the building material 710 of FIG. 6, having a multi-elevational surface configuration in the form of a repeating waffle-type pattern. The waffle-type configuration extends between the perimeter edges of the building material, and defines a plurality of protrusions 722 and recesses 726. FIG. 14 illustrates a cross-sectional view of a building material wherein the building material 710 comprises a plurality of strategically formed and located cavities or voids 746 in the core matrix 714.

FIG. 12 illustrates a detailed side view of another exemplary building material 1010 comprising a core matrix 1014 having a first surface 1018, wherein the first surface 1018 has formed therein a multi-elevational surface configuration comprising a repeating pattern of first protrusions 1022 in the form of pyramids or cones, and a repeating pattern of second protrusions 1024 having an arbitrary shape. The second protrusions 1024 are shown as comprising a primary base protrusion having a square cross-section, upper secondary protrusions 1023, and lateral secondary protrusions 1025, each having a pyramid or cone shape. First and second protrusions 1022 and 1024 define recesses 1026. While the present invention is not intended to be limited to any particular shape of protrusions, FIG. 12 illustrates that arbitrary shapes are at least contemplated.

FIG. 13 illustrates a detailed side view of another exemplary building material 1110 comprising a core matrix 1114 having a first surface 1118, wherein the first surface 1118 has formed therein a multi-elevational surface configuration comprising a repeating pattern of first protrusions 1122 and recesses 1126, wherein these form an egg carton-type pattern.

FIGS. 8-13 thus illustrate several different multi-elevational surface configurations. These, however, are not meant to be limiting in any way. Indeed, one skilled in the art will recognize other configurations and/or patterns that may be used to accomplish the designs of the present invention.

EXAMPLES

The following examples illustrate embodiments of the invention that are presently known. Thus, these examples should not be considered as limitations of the present invention, but are merely in place to teach how to make the best-known compositions and forms of the present invention based upon current experimental data. Additionally, some experimental test data is included herein to offer guidance in optimizing compositions and forms of the utility material. As such, a representative number of compositions and their method of manufacture are disclosed herein.

Example 1

Testing of Utility Material of Cenospheres and Sodium Silicate

A mixture of Cenospheres of the form of Extendospheres™ and sodium silicate were combined and allowed to dry and form a fire-resistant insulating material Extendospheres of a 300-600 micron diameter size range were combined with sodium silicate solution (O type from PQ corporation) in a 1:1 weight ratio. The wet slurry was poured into a cavity around the turbine and allowed to dry. It formed a hardened mass of extendospheres and sodium silicate. The material was tested with an Ipro-Tek single spool gas turbine. The tests showed that the material has a high insulation capacity, and the ability to withstand heat. The insulation was exposed to temperatures of up to 1200° C. However, it was found that when the material is exposed directly to flames for periods of more than a few minutes, it cracks and blisters and begins to lose physical strength.

Example 2

Formation of Mold to Form Wallboard

In one aspect, the utility material can be wallboard panels. The panels can optionally be formed by exposing an uncured wallboard to microwaves. Such formation, as well as general wallboard formation, can utilize a mold. An example of a mold can be made up of a vinylester resin mold having top and bottom pieces. To form the vinylester resin mold, a wood mold is first constructed.

To form the vinylester resin mold, an outer mold of wood is attached to the base of the wood mold using double sided tape. Any releasable binder or means of attaching can be alternatively used. A resin mixture is formed of 97.5 wt % vinylester resin mixed with 2.5 wt % methyl ethyl ketone peroxide (MEKP) catalyst. Microspheres of the form of Extendospheres and the resin mixture are added in a 1:1 ratio to form a core mixture. The core mixture is mixed well using a stirring device that was mounted in a drill such as you would use to mix paint. Mix time was about 3 minutes. The core mixture is poured into the prepared wood mold and distributed to cover the full mold, including all corners. The mixture is gently smoothed out, although not pressed into the mold using short dropping, manual shaking, mechanical vibration, and spreading tools such as trowels. The mixture is not pressed into the wood mold as pressing it can decrease the porosity of the resulting vinylester resin mold and can make it unusable. The mixture is cured at room temperature until it is rigid and strong to the touch. The curing time is typically about three hours. The porous vinylester resin mold is then carefully removed. The resulting vinylester resin mold has a cavity 11.625 inches by 15.25 inches by 0.5 inches deep, with a 0.375 inch wall around the outside edge. A top piece for the vinylester resin mold is formed using the same procedure and results in a mold in a rectangle having dimensions of 12.375 inches by 16 inches by 0.5 inches deep.

Example 3

Preparation of Wallboard Using Mold

As noted, the utility material can be in the form of wallboard panels. The panels can optionally be formed by using the porous vinylester resin mold. First, a wallboard backing paper is cut using a backing paper template. Although a particular backing paper shape is illustrated, it should be understood that the backing paper can be of any shape or size sufficient to form a segment of wallboard. Facing paper is cut to a rectangle sized just smaller than the greater dimensions of the backing paper. In the present embodiment, the facing paper is cut to an 11.625 inch by 15.25 inch rectangle. The backing paper is folded and placed in the porous mold. A wallboard mixture may be formed using:

700 to 900 g microspheres 1100 to 1300 g sodium silicate solution, such as that sold by "O"

300 to 500 g latex binder 20 to 30 cc foaming agent

Specifically, the foaming agent is added first to the sodium silicate solution and mixed using a squirrel mixer at 540 RPM for 2 minutes. The latex binder is added to the mixture and mixed for an additional 30 seconds on the same settings. The microspheres are added slowly while mixing, over 1 to 2 minutes, until the mixture is uniform.

The wallboard mixture is poured into the lined mold and leveled out using a spatula or paint stick. It should be noted that any tool or method could be used at this point to level the mixture. The mixture is further leveled by vigorous shaking. The sheet of facing paper is placed on top of the mixture and covered with the top panel of the vinylester resin mold. The mold is placed in a microwave and the panel is radiated for the desired amount of time. Preferably, the mold is turned often to produce a more even drying of the panel. The panel should not be subjected to continuous radiation for any extended amount of time to reduce or prevent large voids in the wallboard core. The power level of the microwave radiation can be set to control the amount of time the microwave is on. The time on and off of the microwave can be according to Table 1:

TABLE 1

| Power Level | Time On (Seconds) | Time Off (Seconds) |
|---|---|---|
| 1 | 3 | 19 |
| 2 | 5 | 17 |
| 3 | 7 | 15 |
| 4 | 9 | 13 |
| 5 | 11 | 11 |
| 6 | 13 | 9 |
| 7 | 15 | |
| 8 | 17 | 5 |
| 9 | 19 | 3 |
| 10 | 22 | 0 |

Once properly heated, the resulting panel of wallboard can be carefully removed from the mold.

Example 4

Flexural Strength Testing

An important feature of wallboard is the flexural strength of the board. Each sample board was prepared by forming a core matrix material including the components outlined in Table 2 and spreading the mixture into a mold cavity and leveling it off. The resulting sample is 0.50 inches thick and 2 inches wide. Each sample is dried in an oven at 100° C. until dry as determined by Aquant moisture meter. The sample is suspended between two supports that are 6 inches apart so that 1-1.5 inches rests on either side of the support. A quart size paint can is placed in the center of the suspended sample and slowly filled with water until the sample breaks at which point the weight of the can is measured and recorded. Flexural strength is important for normal handling, installation, and use. Strength at least equal to gypsum wallboard was desired, for uses wherein the wallboard could replace conventional gypsum wallboard. Each wallboard includes a different composition as outlined in Table 2.

TABLE 2

| Run | Cenospheres (g) | Water (g) | Binder (type, g) | Foaming Agent (g) | Dry weight (g) | Weight to break (kg) |
|---|---|---|---|---|---|---|
| 1 | 50 | 6.0 | O, 52.4 | 1.0 | 70.2 | 5.0 |
| 2 | 50 | 0 | O, 87.2 | 2.0 | 83.7 | 20.6 |
| 3 | 50 | 14.1 | RU, 42.9 | 1.0 | 70.2 | |
| 4 | 50 | 14.4 | RU, 71.4 | 2.0 | 83.6 | 18.0 |
| Foam | 50 | 20 | RU, 71.4 | 16.4 | 83.6 | 9.2 |
| 5 | 50 | 8.0 | BW-50, 47.6 | 1.0 | 70.2 | 5.1 |
| 6 | 50 | 7.0 | BW-50, 79.2 | 2.0 | 83.7 | 7.4 |

The ingredients in each row were combined then mechanically whipped to produce a foamed product. The foamed product was then cast in a mold. All binders used are sodium silicate based. Type O binder is a viscous sodium silicate solution from PQ Corporation. Type RU binder is also from PQ Corporation and is a sodium silicate solution that is similar to O type but not as viscous. RU type is more watery and has a lower solids content. And, type BW-50 binder, also from PQ Corporation. BW-50 is also a sodium silicate solution, and has a lower ratio of silica to disodium oxide. As illustrated, the amount and type of binder can be optimized to create a wide range of flexural strengths.

Example 5

Flexural Strength Testing II

Flexural strength testing was conducted on seven sample boards according to the procedure outlined in Example 4. The components of each sample board and the flexural strength testing weight are recorded in Table 3.

TABLE 3

| Run | Cenospheres (g) | Water (g) | Binder (g) | Foaming Agent (g) | Dry weight (g) | Weight to break (kg) - no paper | Weight to break (kg) - Manilla folder | Weight to break (kg) - cardboard |
|---|---|---|---|---|---|---|---|---|
| 1 | 50 | 17.9 | 14.3 | 1.0 | 56.7 | | | |
| 2 | 50 | 15.5 | 28.6 | 1.0 | 63.5 | 2.06 | | |
| 3 | 50 | 12.1 | 42.9 | 1.0 | 70.2 | 11.96 | 21.55 | |
| 4 | 50 | 14.3 | 57.1 | 2.0 | 76.9 | 14.37 | | |
| 5 | 50 | 14.4 | 71.4 | 2.0 | 83.6 | 15.35 | 26.89 | 36.65 |
| 6 | 50 | 11.6 | 85.7 | 2.0 | 90.4 | 21.8 | | |
| 7 | 50 | 9.4 | 100.0 | 2.0 | 97.1 | 20.85 | 29.40 | 34.99 |
| Ceiling Tile ½" thick | | | | | | | 5.57 | |
| Dry wall ½" thick | | | | | | | 26.91 | |

As illustrated, increasing the density and increasing the binder content in the sample generally results in stronger samples. Increasing the amount of water in the sample mixture generally decreases the density of the mixture and results in decreased strength of the sample. In the samples including testing with a Manilla folder and/or cardboard, the noted material was placed on both sides of the sample. Such arrangement, with the core material flanked by a paper product, is comparable to conventional gypsum wallboard. As illustrated, the inclusion of paperboard on both sides, either in the illustrated form of Manilla folder or cardboard, significantly increased the sample's strength.

Example 6

Flexural Strength Testing III

A number of sample panels were formed according to the procedure outlined in Example 4, with the exceptions that strips of paper of the noted thickness to 2 inches wide by 11 inches long. One strip is placed in the mold cavity before pouring in the core matrix material. After pouring and leveling the mixture, another sheet of the same thickness is placed on top of the mixture. The mixture is covered with wire mesh and weighed down to keep it in place during drying. For the results listed below, the paper did not properly adhere to the core matrix, so the test results reflect samples having only one sheet of paper attached. The flexural strength tests were performed paper side down. Presumptively, the results would be higher for a sample including both facing sheets.

The core matrix material for each sample included 250 g Extendospheres, 40 g water, 220 g binder, 10 g foaming agent. The dry weight for each sample is 334.9. For paper having a thickness of 0.009", the weight to break was 6.6 kg. For paper having a thickness of 0.015", the weight to break was 7.5 kg. For paper having a thickness of 0.020", the weight to break was 5.2 kg.

Example 7

Additional Testing on Sample Boards

A number of sample panels were formed in accordance with the methods and compositions outlined in the previous Examples. Typically, a mixture such as that given above is cast in a mold comprising paper disposed above and below the core and a frame around the perimeter of the sample to contain the wet core material while it dries and cures. After drying and heating the wallboard sample can be tested for mechanical properties. The composition of each sample and the associated results are illustrated in Table 4.

Flexural Strength Testing—"Flex"

A 0.5 inch thick sample that is 2 inches wide by 6 to 8 inches long is placed on the test fixture and is thus suspended between two legs. The legs are approximately 4.25 inches apart. The test apparatus is equipped with the flexural test attachment, with the bar on the attachment situated parallel to the test specimen. The flexural test attachment is centered midway between the legs of the test fixtures. A bucket is hooked to the end of the test apparatus and weight is slowly added to the bucket until the test specimen fails. The weight of the bucket is measured to obtain the Flex results.

Nail Pull Resistance Testing

A 0.5 inch thick sample that is 6 inches wide by 6 inches long is drilled to have a 5/32 inch pilot hole in the center of the sample. The sample is placed on a nail pull fixture, with the pilot hole centered on the 2.5 inch diameter hole in the nail pull fixture. A nail is inserted into the pilot hole. The shank of the nail should be approximately 0.146 inches in diameter, and the head of the nail should be approximately 0.330 inches in diameter. A screw is inserted into the indicated hole on the test apparatus so that it sticks out a distance of approximately 2 inches. The head of the screw should be smaller than the head of the nail used in the test. The sample and fixture are positioned underneath the apparatus so that the centerlines of the nail and screw line up. A bucket is hooked to the end of the test apparatus. Weight is slowly added to the bucket until the test specimen fails. The weight of the bucket is measured.

Cure, End, and Edge Hardness Testing

A 0.5 inch thick sample that is 2 inches wide by 6 to 8 inches long is clamped in the vice of the testing equipment. A screw is inserted into the indicated hole on the test apparatus so that it sticks out a distance of approximately 1.5 inches. The head of the screw should be 0.235 inches in diameter. The vice and sample are positioned underneath the test apparatus, so that the head of the screw is centered on the 0.5 inch edge of the sample. A bucket is hooked to the end of the test apparatus. Weight is slowly added to the bucket until the screw penetrates at least 0.5 inches into the sample. If the screw slips off of the side and tears through the paper, the sample is discarded and the test is repeated.

TABLE 4

| Run | Cenospheres (g) | Organic Binder (g) | Foaming Agent (g) | Water (g) | Dry Weight (g) | Flex | Hardness | Nail Pull | Density |
|---|---|---|---|---|---|---|---|---|---|
| 1 | 50 | 75 | 0 | 20 | 78.73 | 30.3 | | | 10.5 |
| 2 | 50 | 75 | 0 | 20 | 78.73 | 41.6 | | | 7.9 |
| 3 | 50 | 75 | 0 | 20 | 78.73 | 24.7 | | | 7.7 |
| 4 | 50 | 75 | 1 | 0 | 78.73 | | | | |
| 5 | 50 | 75 | 2 | 0 | 78.73 | 17.6 | | | |
| 6 | 50 | 100 | 0 | 0 | 88.30 | 17.6 | | | 10.3 |
| 7 | 50 | 100 | 1 | 0 | 88.30 | 31.3 | 13.6 | 22.6 | |
| 8 | 50 | 100 | 1 | 0 | 88.30 | 16.3 | | | 6.8 |
| 9 | 50 | 100 | 1 | 0 | 88.30 | 19.4 | | | 6.3 |
| 10 | 50 | 100 | 2 | 0 | 88.30 | 16.6 | | | |
| 11 | 50 | 125 | 0 | 0 | 97.88 | 22.5 | | | 8.2 |
| 12 | 50 | 125 | 0 | 0 | 97.88 | 35.0 | | | 8.5 |
| 13 | 50 | 125 | 0 | 0 | 97.88 | 31.6 | | | 7.9 |
| 14 | 50 | 125 | 1 | 0 | 97.88 | 23.7 | | | 7.3 |
| 15 | 50 | 125 | 2 | 0 | 97.88 | 22.4 | | | 6.5 |
| 16 | 50 | 150 | 0 | 0 | 107.45 | 35.8 | 41.8 | 31.0 | 9.8 |
| 17 | 50 | 150 | 0 | 0 | 107.45 | 27.5 | | | 8.3 |
| 18 | 50 | 150 | 0 | 0 | 107.45 | 21.8 | | | 7.5 |

TABLE 4-continued

| Run | Cenospheres (g) | Organic Binder (g) | Foaming Agent (g) | Water (g) | Dry Weight (g) | Flex | Hardness | Nail Pull | Density |
|---|---|---|---|---|---|---|---|---|---|
| 19 | 50 | 150 | 1 | 0 | 107.45 | 18.0 | | | 9.0 |
| 20 | 50 | 150 | 2 | 0 | 107.45 | 16.6 | | | 6.6 |
| | | Dry-wall average of 5 tests | | | | 30.9 | 38.0 | 53.6 | 10.4 |

Example 8

Test Results II

A sample of wallboard including 50 g Extendospheres, and 2 cc surfactant. The first type of wallboard tested included 100 g of sodium silicate binder mixture. The second type of wallboard tested included 75 g sodium silicate binder mixture and 25 g latex binder. The test boards had a thickness range from 0.386 inches to 0.671 inches. Testing was completed according to ASTM 473-3, 423, E119, and D3273-00 standards.

Flexural strength was tested and determined to be an average of 170 lbf (white side up) for the wallboard of the first type, based on three samples. The wallboard of the second type was found to average 101 lbf (white side down), based on three samples. The highest measurement of the six test samples was 197 lbf. A comparative conventional gypsum wall board was measured to be 107 lbf.

Edge hardness was determined to be an average of 15 lbf. The gypsum wall board had an average minimum edge hardness of 11 lbf. The sample showed a 36% improvement over the gypsum sample.

Nail pull resistance was measured to be 99 lbf, based on a 3 sample average. The gypsum wall board, on the other hand, measured a 77 lbf.

The thermal resistance of the sample wall board was tested. One side of the wall board was raised to 100° C. for two hours with no measurable temperature increase on the cool side of the sample.

The weight of the sample was compared to the conventional gypsum and found to be approximately 30% less than the gypsum board.

Example 9

Wallboard Formation

As another example of wallboard formation, a sodium silicate wallboard is formed by the following procedure. Sodium silicate is first foamed by adding 2 cc Steol FS 406 to 100 g sodium silicate solution (PQ Corporation O binder). The mixture is placed in a 6 inch diameter paint container. The mixture is mixed using a 3 inch diameter "Squirrel" mixer attached to a drill press running at 540 rpm. The operator rotates the paint container in the opposite direction than that of the mixer. The mixture is foamed for approximately one minute and fifteen seconds. The volume of the sodium silicate should at least double during the foaming process. 50 g of Extendospheres™ (having a size of 300 to 600 microns) are added to the mixture and mixed for one more minute with the "Squirrel" mixer. The vanished mix is then poured into the mold and smoothed with a paint stick.

Once the foamed mixture is smoothed in the mold, the mold is placed in an oven set at 85° C. The mixture is allowed to dry for approximately 12 hours at this temperature.

The backing paper is added to the core after the core has dried sufficiently. A light coat of sodium silicate is painted onto the back of the paper, and the paper is placed on the core matrix. The core and paper are covered on all sides by a polyester breather material and then placed in a vacuum bag. The vacuum bag is placed in an oven set at 85° C. and a vacuum is applied to the part. The part is allowed to dry for 45 minutes to one hour in the oven. The finished part is then removed from the oven and trimmed to desired size. Various materials can optionally be added to the core composition to accelerate drying.

Example 10

Wallboard Formation II

Another wallboard is produced according to the method in Example 9. The composition of the wallboard is altered in that 75 g of sodium silicate binder solution is used along with 25 g organic binder. The organic binder is added to the sodium silicate binder solution along with the Steol, prior to foaming.

Example 11

Wallboard Formation III

Another wallboard is produced by first masking a mold. A base board is lined with FEP. The FEP is wrapped tightly to reduce wrinkling on the surface. Boarder pieces of the mold are wrapped with Blue Flash Tape. Killer Red Tape is used to attached to border pieces to the base piece to form a border with an inside dimension of 14 inches by 18 inches.

500 g of microspheres (300-600 microns in size), 750 g "O" binder, 250 g organic binder, and 20 cc foaming agent are measured and set aside. The O binder and foaming agent are mixed using a Squirrel mixer at 540 RPM for about 2 minutes. The organic binder is added to the mixture and mixed for an additional 30 seconds. The microspheres are slowly added while mixing. When all microspheres are added, the mixture is mixed for an additional 30 seconds or until the mixture is uniform. The mixture is poured into the mold and leveled with a spatula. The mold is additionally subjected to vigorous shaking for additional leveling. The mold is placed into an oven at 100° C. and dried for 12 to 18 hours until completely dry. Paper is applied to the sample by first cutting a piece of backing paper and a piece of facing paper slightly larger than the panel. An even coat of sodium silicate solution is applied to one side of the paper. The paper is placed on top and bottom surfaces of the panel and pressure is applied evenly across the surface. The pressure can optionally be applied by vacuum bagging the panel. The panel can be placed back in the oven at 100° C. for about 15 minutes until the paper is fully adhered to the surface of the panel.

Example 12

Sound Trap Acoustic Test

A control sound trap is constructed in a configuration as described herein, where each of the first and second building materials have a core matrix of microparticles in a binder with facing material on both sides of each of the first and second building materials. A test sound trap is constructed in a similar configuration, but where the first building material lacks the facing material on the side facing the second building material. The two sound traps are further tested as follows:

Each sound trap is placed in an anechoic chamber with a sound presentation speaker on one side of the sound trap and sound pressure level meter positioned on the other side of the sound trap. A series of tones ranging from 110 Hz to 8000 Hz are sequentially delivered at approximately 100 dB from the sound presentation speaker toward the sound trap, and the sound pressure level is recorded on the other side of the sound trap. The average sound pressure level for the tones from 110 Hz to 8000 Hz for the control sound trap is about 58.5 dB. The average sound pressure level for the tones from 110 Hz to 8000 Hz for the test control trap is about 51.5 dB. Thus the removal of the facing paper from one of the building material members results in a sound reduction of about 7.0 dB across the sound trap.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A sound attenuating building material, comprising:
    a core matrix disposed on a facing material, the core matrix comprising: a plurality of cenospheres and perlite; and
    a sodium silicate binder adhering together the cenospheres and perlite to form a porous core matrix; an acoustically transparent material disposed on the exposed face of the building material; and wherein the acoustically transparent material is a mesh material.

2. The building material of claim 1, wherein the cenospheres have an outer shell and a hollow interior filled with a gas.

3. The building material of claim 1, wherein the cenospheres have a crush strength between 3000 psi and 5000 psi.

4. The building material of claim 1, wherein the sodium silicate is a solution of sodium silicate in water.

5. The building material of claim 4, wherein the solution comprises a 1:1 ratio of sodium silicate to water.

6. The building material of claim 1, wherein the cenospheres have a 300 micron to 600 micron diameter size range.

7. The building material of claim 1, wherein the core matrix further comprises a setting agent.

8. The building material of claim 7, wherein the setting agent is Class C fly ash.

9. The building material of claim 1, wherein the core matrix further comprises a water soluble polymer.

10. The building material of claim 9, wherein the water soluble polymer is polyethylene oxide.

11. The building material of claim 1, wherein the core matrix further comprises a surfactant.

12. The building material of claim 1, wherein the core matrix further comprises a foaming agent.

13. The building material of claim 1, wherein a side of the core matrix is at least partially exposed to create an exposed face of the building material to increase sound attenuation by reducing reflections from sound waves impinging on the building material as compared to a control building material lacking an exposed face.

14. The building material of claim 13, wherein the exposed face has a plurality of protrusions extending from the core matrix.

15. The building material of claim 14, wherein the plurality of protrusions are spaced in a predetermined pattern.

16. The building material of claim 1, further comprising a rigid material associated with the core matrix.

17. The building material of claim 16, wherein the rigid material is disposed within the core matrix.

* * * * *